United States Patent
Lin et al.

(10) Patent No.: US 9,118,255 B2
(45) Date of Patent: Aug. 25, 2015

(54) FLYBACK POWER CONVERTER AND ELECTRONIC APPARATUS

(71) Applicant: LITE-ON TECHNOLOGY CORPORATION, Taipei (TW)

(72) Inventors: Chung-Yi Lin, New Taipei (TW); Wei-Lieh Lai, New Taipei (TW); Chu-Yi Chou, New Taipei (TW); Yu-Kang Lo, Taipei (TW); Huang-Jen Chiu, New Taipei (TW); Jing-Yuan Lin, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 271 days.

(21) Appl. No.: 13/776,791

(22) Filed: Feb. 26, 2013

(65) Prior Publication Data

US 2014/0133192 A1  May 15, 2014

(30) Foreign Application Priority Data

Nov. 14, 2012  (TW) .............................. 101142370 A

(51) Int. Cl.
H02M 3/335  (2006.01)
(52) U.S. Cl.
CPC ........ *H02M 3/33592* (2013.01); *Y02B 70/1475* (2013.01)

(58) Field of Classification Search
CPC .......................... H02M 3/33592; H02M 3/335
USPC ........................................................ 363/21.14
See application file for complete search history.

(56) References Cited

U.S. PATENT DOCUMENTS

2007/0103946 A1*  5/2007  Kyono ...................... 363/21.14

* cited by examiner

*Primary Examiner* — Harry Behm
(74) *Attorney, Agent, or Firm* — Li&Cai Intellectual Property (USA) Office

(57) ABSTRACT

A flyback power converter is disclosed. The flyback power converter includes a voltage transformer, a main switch, a synchronous rectification switch, a synchronous rectification control circuit, a sampling circuit and an operation circuit. A control end of the main switch receives a main switch signal so as to control the main switch. The synchronous rectification control circuit transmits control signal to control end of the synchronous rectification switch according to sensing signal received. The sampling circuit samples the state of the synchronous rectification switch so as to generate first logic signal and second logic signal. The operation circuit executes timing for charging/discharging according to the first and the second logic-signal, so as to output switch cut-off pulse signal to a voltage-dividing circuit. If voltage of the sensing signal is lower than predetermined threshold voltage, the synchronous rectification switch enters into cut-off state according to the control signal.

26 Claims, 8 Drawing Sheets

FLYBACK POWER CONVERTER AND ELECTRONIC APPARATUS

BACKGROUND OF THE DISCLOSURE

1. Field of the Disclosure

The present disclosure relates to flyback power converter; in particular, to a flyback power converter which is able to perform a synchronous rectification under either a continuous conduction mode or a discontinuous conduction mode.

2. Description of Related Art

In recent years, there is a boost in developing a switching power supply and the switching power supply has been played an extremely important role in computers and other electronic products. In comparison to a traditional power supply, the switching power supply has advantages such as higher stability, simplicity, and efficiency. Among which, a flyback power converter has been broadly used due to a lower cost and a simplified circuit design.

A common method of controlling the flyback power converter in synchronous rectification is to use a synchronous rectification control chip to detect a drain-to-source voltage of a synchronous rectification switch. When a primary side switch is cut off, the secondary-side body diode of the synchronous rectification switch is forced to be switched on to provide a current path allowing a magnetizing inductance to release energy. During the time, an absolute value of the drain-to-source voltage of the synchronous rectification switch is higher than a switched-on threshold conductive voltage predetermined by the synchronous rectification control chip, and thus the synchronous rectification switch is enabled by the synchronous rectification control chip. With the magnetizing inductance gradually releasing power to a load, the absolute value of the drain-to-source voltage decreases, and once the absolute value be lower than a cut-off threshold voltage predetermined by the synchronous rectification control chip, the synchronous rectification switch is disabled by the synchronous rectification control chip.

However, the method is only ensured that the synchronous rectification switch is successfully disabled before a primary side switch switched on in a next switching period under a discontinuous conduction mode. If it is under a continuous conduction mode, a continuous magnetizing inductance current leads the absolute value of the drain-to-source voltage easily higher than the cut-off threshold voltage predetermined by the synchronous rectification control chip within a switching period, and it will be until the primary side switch to be switched on in the next switching period, the magnetizing inductance transformed from releasing energy to storing energy, the secondary side of a transformer senses a process that a corresponding voltage transformed from a negative voltage to a positive voltage, and the absolute value of the drain-to-source voltage is lower than the cut-off threshold voltage predetermined by the synchronous rectification control chip, and finally the drain-source voltage of the synchronous rectification switch is disabled by the synchronous rectification control chip. Although the method is finally able to disable the synchronous rectification switch, there is a short moment when both the primary side switch and the synchronous rectification switch are switched on before the synchronous rectification switch is disabled, and thereby a problem of shoot-through is caused. As a result, a current stress of the synchronous rectification switch is increased, and a voltage surge of the drain-to-source voltage of the synchronous rectification switch also increases when the synchronous rectification switch is switched off, which increases the voltage stress of the synchronous rectification switch along with a switching consumption; therefore, an overall switching efficiency is lowered, a more cost in high voltage and current stresses of the synchronous rectification switch is caused.

SUMMARY OF THE DISCLOSURE

The present disclosure provides a flyback power converter for a synchronous rectification, and the flyback power converter transforms an input voltage received into an output voltage. The flyback power converter includes a transformer, a main switch, a synchronous rectification switch, a synchronous rectification control circuit, a sampling circuit, and an operation circuit. The transformer has a primary side and a secondary side, wherein both ends of a magnetizing inductance are coupled to a winding on the primary side of the transformer. A control end of the main switch receives a main switch switching signal to control the main switch to be switched on or off, and a drain of the main switch is coupled to the winding on the primary side of the transformer, and a source of the main switch is coupled to a first ground voltage. The synchronous rectification switch is coupled to a winding on the secondary side of the transformer, and the drain and the source of the synchronous rectification switch are respectively coupled to a cathode and an anode of a body diode, a signal of a drain-to-source voltage of the synchronous rectification switch is equal to a main switch switching signal. The synchronous rectification control circuit is used to transmit a control signal to the control end of the synchronous rectification switch according to a sensing signal received, wherein the sensing signal is generated by the voltage-dividing circuit according to a switch cut-off pulse signal and a signal of the drain-to-source voltage of the synchronous rectification switch. The sampling circuit is coupled to the drain of the synchronous rectification switch so as to generate a first logic signal and a second logic signal. The operation circuit is coupled to the sampling circuit, receiving the first logic signal and the second logic signal and accordingly executing timing for charging/discharging, and further outputting the switch cut-off pulse signal to the voltage-dividing circuit. If a voltage of the sensing signal is lower than a predetermined threshold voltage, the synchronous rectification switch enters into a cut-off state according to the control signal, and when the synchronous rectification switch is cut off, the body diode is switched on to provide a current path for the magnetizing inductance to release energy.

In an embodiment of the present disclosure, when the flyback power converter performs the synchronous rectification, the flyback power converter operates alone on the secondary side of the transformer.

In an embodiment of the present disclosure, during the switching period, when the main switch signal is transformed into a low level voltage, the control signal is transformed into a high level voltage, and when the voltage of the sensing signal is lower than the predetermined threshold voltage, the control signal is transformed into a low level voltage to cut the synchronous rectification switch off earlier.

In an embodiment of the present disclosure, when the first logic signal or the second logic signal is a low level voltage, the operation circuit executes timing for discharging; when the first logic signal or the second logic signal is a high level voltage, the operation circuit executes timing for charging, wherein the first logic signal and the second logic signal are complementary logically.

In an embodiment of the present disclosure, when discharging until it is lower than a timing threshold voltage, the operation circuit outputs the switch cut-off pulse signal to cut the synchronous rectification switch off, and when the switch cut-off pulse signal is transformed into a low level voltage, the main switch switching signal is transformed into a high level voltage.

In an embodiment of the present disclosure, the sampling circuit further receives a clock signal so as to generate the first logic signal and the second logic signal, wherein the clock signal is synchronous to the main switch switching signal.

In an embodiment of the present disclosure, the operation circuit includes a first charge-discharge circuit, a first peak value detecting circuit, and a first threshold voltage generating circuit. The first charge-discharge circuit receives the first logic signal to execute timing for the charging/discharging, and outputting a first capacitor voltage. The first peak value detecting circuit is coupled to the first charge-discharge circuit to receive the first capacitor voltage and outputs a first direct current (DC) voltage, wherein the first DC voltage is lower than a peak value of the first capacitor voltage. The first threshold voltage generating circuit is coupled to the first peak value detecting circuit, receiving the first DC voltage and a first compensation voltage to generate a first peak value voltage, and further outputting a first threshold voltage through a first voltage-dividing ratio. The first threshold voltage is timing threshold voltage, and the first peak value voltage is the peak value of the first capacitor voltage.

In an embodiment of the present disclosure, the operation circuit further includes a second charge-discharge circuit, a second peak value detecting circuit, and a second threshold voltage generating circuit. The second charge-discharge circuit receives the second logic signal to execute the timing for charging/discharging, and outputs a second capacitor voltage. The second peak value detecting circuit is coupled to the second charge-discharge circuit to receive the second capacitor voltage and to output a second DC voltage, wherein the second DC voltage is lower than a peak value of the second capacitor voltage. The second threshold voltage generating circuit is coupled to the second peak value detecting circuit, receiving the second DC voltage and a second compensation voltage to generate a second peak value voltage, and further outputting a second threshold voltage through a second voltage-dividing ratio. The second threshold voltage is timing threshold voltage, and the second peak value voltage is the peak value of the second capacitor voltage.

In an embodiment of the present disclosure, the operation circuit further includes a voltage trigger generating circuit. The voltage trigger generating circuit is coupled to the sampling circuit, the first and second charge-discharge circuits, the first and second threshold voltage generating circuits, and the voltage-dividing circuit, wherein the voltage trigger generating circuit outputs a switch cut-off pulse signal, a first discharging pulse signal, and a second discharging pulse signal according to the first and the second logic signals received, the first and the second capacitor voltages, and the first and the second threshold voltages.

In an embodiment of the present disclosure, when the first capacitor voltage is lower than the first threshold voltage, the voltage trigger generating circuit outputs the first discharging pulse signal to the first charge-discharge circuit to reduce the first capacitor voltage until being a zero voltage.

In an embodiment of the present disclosure, when the second capacitor voltage is lower than the second threshold voltage, the voltage trigger generating circuit outputs the second discharging pulse signal to the second charge-discharge circuit to reduce the second capacitor voltage until being a zero voltage.

In an embodiment of the present disclosure, when the voltage trigger generating circuit outputs the first or the second discharging pulse signal, the switch cut-off pulse signal is outputted in the meantime to cut off the synchronous rectification switch earlier before the next switching period.

In an embodiment of the present disclosure, the sampling circuit includes a first resistor, a second resistor, a third resistor, a fourth resistor, a first comparator, a fifth resistor, a second comparator, and a D-type flip-flop. A terminal of the first resistor is coupled to a drain of a synchronous rectification switch. A terminal of the second resistor is coupled to another terminal of the first resistor, and another terminal of the second resistor is coupled to a second ground voltage. A terminal of the third resistor is coupled to another terminal of the first resistor. A terminal of the fourth resistor receives a first voltage. A negative input end of the first comparator is coupled to another terminal of the third resistor, and a positive input end of the first comparator is coupled to another terminal of the fourth resistor. A terminal of the fifth resistor is coupled to a positive input end of the first comparator, and another terminal of the fifth resistor is coupled to an output terminal of the first comparator. A negative input end of the second comparator is coupled to the output terminal of the first comparator, and a positive input end of the second comparator receives a second voltage. A data input end of the D-type flip-flop is coupled to a data anti-output end, and a data output end of the D-type flip-flop outputs a first logic signal, and the data anti-output end of the D-type flip-flop outputs a second logic signal, and a clock input end of the D-type flip-flop is coupled to the output end of the second comparator and receives a clock signal.

In an embodiment of the present disclosure, the first charge-discharge circuit includes a first charging resistor, a second charging resistor, a third charging resistor, a first transistor, and a first timing capacitor. A terminal of the first charging resistor is coupled to a system voltage. A terminal of the second charging resistor is coupled to another terminal of the first charging resistor, and another terminal of the second charging resistor is coupled to the second ground voltage. A terminal of the third charging resistor is coupled to the system voltage. A base of the first transistor is coupled to another terminal of the first charging resistor, and an emitter of the first transistor is coupled to another terminal of the third charging resistor. A terminal of the first timing capacitor is coupled to the collector of the first transistor, and another terminal of the first timing capacitor is coupled to the second ground voltage, wherein a first charging current source is consisted of the first charging resistor, the second charging resistor, the third charging resistor, and the first transistor.

In an embodiment of the present disclosure, the first charge-discharge circuit further includes a second transistor, a third transistor, a fourth transistor, a first discharging resistor, and a fifth transistor. A drain of the second transistor is coupled to a terminal of the first timing capacitor, and a gate of the second transistor receives a first discharging pulse signal, and a source of the second transistor is coupled to the second ground voltage. A collector of the third transistor is coupled to a terminal of the first timing capacitor, and an emitter of the third transistor is coupled to the second ground voltage. A base of the fourth transistor is coupled to a base of the third transistor, and an emitter of the fourth transistor is coupled to the second ground voltage. A terminal of the first discharging resistor is coupled to the system voltage, and another terminal of the first discharging resistor is coupled to a collector and the base of the fourth transistor. A drain of the fifth transistor is coupled to another terminal of the first discharging resistor, and a gate of the fifth transistor receives the first logic signal, and a source of the fifth transistor is coupled to the second ground voltage, wherein a first discharging current source is consisted of the third transistor, the fourth transistor, and the first discharging resistor.

In an embodiment of the present disclosure, when the first logic signal is a high level voltage, the first timing capacitor is charged by the first charging current source so as to generate the first capacitor voltage; when the first logic signal is a low level voltage, the first timing capacitor discharges to the first discharging current source so as to release the first capacitor voltage, wherein when the first capacitor voltage is lower than the first threshold voltage, the second transistor is switched on according to the first discharging pulse signal so as to accelerate the discharging from the first timing capacitor and further to reduce the first capacitor voltage until being a zero voltage.

In an embodiment of the present disclosure, the second charge-discharge circuit includes a fourth charging resistor, a fifth charging resistor, a sixth charging resistor, a six transistor, and a second timing capacitor. A terminal of the fourth charging resistor is coupled to the system voltage. A terminal of the fifth charging resistor is coupled to another terminal of the fourth charging resistor, and another terminal of the fifth charging resistor is coupled to the second ground voltage. A terminal of the sixth charging resistor is coupled to the system voltage. A base of the sixth transistor is coupled to another terminal of the fourth charging resistor, and an emitter of the sixth transistor is coupled to another terminal of the sixth charging resistor. A terminal of the second timing capacitor is coupled to a collector of the sixth transistor, and another terminal of the second timing capacitor is coupled to the second ground voltage, wherein a second charging current source is consisted of the fourth charging resistor, the fifth charging resistor, the sixth charging resistor, and the sixth transistor.

In an embodiment of the present disclosure, the second charge-discharge circuit further includes a seventh transistor, an eighth transistor, a ninth transistor, a second discharging resistor, and a tenth transistor. A drain of the seventh transistor is coupled to a terminal of the second timing capacitor, and a gate of the seventh transistor receives a second discharging pulse signal, and a source of the seventh transistor is coupled to the second ground voltage. A collector of the eighth transistor is coupled to a terminal of the second timing capacitor, and an emitter of the eighth transistor is coupled to the second ground voltage. A base of the ninth transistor is coupled to the base of the eighth transistor, and an emitter of the ninth transistor is coupled to the second ground voltage. A terminal of the second discharging resistor is coupled to the system voltage, and another terminal of the second discharging resistor is coupled to a collector and the base of the ninth transistor. A drain of the tenth transistor is coupled to another terminal of the second discharging resistor, and a gate of the tenth transistor receives the second logic signal, and a source of the tenth transistor is coupled to the second ground voltage, wherein a second discharging current source is consisted of the eighth transistor, the ninth transistor, and the second discharging resistor.

In an embodiment of the present disclosure, when the second logic signal is a high level voltage, the second timing capacitor is charged by the second charging current so as to generate the second capacitor voltage; when the second logic signal is a low level voltage, the second timing capacitor discharged to the second discharging current source to release the second capacitor voltage, wherein when the second capacitor voltage is lower than the second threshold voltage, the seventh transistor is switched on according to the second discharging pulse signal so as to accelerate the discharging from the second timing capacitor, and further to reduce the second capacitor voltage until being a zero voltage.

In an embodiment of the present disclosure, the first peak value detecting circuit includes a diode, a first storing capacitor, a third discharging resistor, and a first amplifier. An anode of the first diode receives the first capacitor voltage. A terminal of the first storing capacitor is coupled to a cathode of the first diode, and another terminal of the first storing capacitor is coupled to the second ground voltage. The third discharging resistor is coupled to the first storing capacitor in parallel. A positive input end of the first amplifier is coupled to a terminal of the first storing capacitor, and a negative input end of the first amplifier is coupled to an output terminal of the first amplifier, wherein the output terminal of the first amplifier outputs a first DC voltage, and the first DC voltage is equal to a peak value of a first capacitor voltage minus a forward voltage of the first diode.

In an embodiment of the present disclosure, the first threshold voltage generating circuit includes a first adder resistor, a second adder resistor, a second amplifier, a third adder resistor, a fourth adder resistor, a first voltage-dividing resistor and a second voltage-dividing resistor. A terminal of the first adder resistor receives the first DC voltage. A terminal of the second adder resistor is coupled to another terminal of the first adder resistor, and another terminal of the second adder resistor is coupled to the first compensation voltage, wherein the first compensation voltage is a forward voltage of the first diode. A positive input end of the second amplifier is coupled to another terminal of the first adder resistor. A terminal of the third adder resistor is coupled to a negative input end of the second amplifier, and another terminal of the third adder resistor is coupled to the second ground voltage. A terminal of the fourth adder resistor is coupled to a terminal of the third adder resistor, and another terminal of the fourth adder resistor is coupled to the output terminal of the second amplifier, and the fourth adder resistor outputs a first peak value voltage through the output terminal of the second amplifier, and the first peak value voltage is the peak value of the first capacitor voltage. A terminal of the first voltage-dividing resistor receives the first peak value voltage. A terminal of the second voltage-dividing resistor is coupled to another terminal of the first voltage-dividing resistor and the second voltage-dividing resistor outputs a first threshold voltage, and another terminal of the second voltage-dividing resistor is coupled to the second ground voltage, wherein a first voltage-dividing ratio is a resistor value of the second voltage-dividing resistor divided by a sum of the resistor values of the first and the second voltage-dividing resistors, and the first threshold voltage is the first voltage-dividing ratio multiplied by the first peak value voltage.

In an embodiment of the present disclosure, the second peak value detecting circuit includes a second diode, a second storing capacitor, a fourth discharging resistor, and a third amplifier. An anode of the second diode receives the second capacitor voltage. A terminal of the second storing capacitor is coupled to a cathode of the second diode, and another terminal of the second storing capacitor is coupled to the second ground voltage. The fourth discharging resistor is coupled to the second storing capacitor in parallel. A positive input end of the third amplifier is coupled to another terminal of the second storing capacitor, and a negative input end of the third amplifier is coupled to an output terminal of the third amplifier, wherein the output terminal of the third amplifier outputs a second DC voltage, and the second DC voltage is equal to a peak value of a second capacitor voltage minus a forward voltage of the second diode.

In an embodiment of the present disclosure, the second threshold voltage generating circuit includes a fifth adder resistor, a sixth, adder resistor, a fourth amplifier, a seventh adder resistor, an eighth adder resistor, a third voltage-dividing resistor, and a fourth voltage-dividing resistor. A terminal of the fifth adder resistor receives a second DC voltage. A terminal of the sixth adder resistor is coupled to another terminal of the fifth adder resistor, and another terminal of the sixth adder resistor is coupled to a second compensation voltage, wherein the second compensation voltage is a forward voltage of the second diode. A positive input end of the fourth amplifier is coupled to another terminal of the fifth adder resistor. A terminal of the seventh adder resistor is coupled to a negative input end of the fourth amplifier, and another terminal of the seventh adder resistor is coupled to the second ground voltage. A terminal of the eighth adder resistor is coupled to a terminal of the seventh adder resistor, and another terminal of the eighth adder resistor is coupled to an output terminal of the fourth amplifier, and the eighth adder resistor outputs a second peak value voltage through the output terminal of the fourth amplifier, and the second peak value voltage is a peak value of the second capacitor voltage. A terminal of the third voltage-dividing resistor receives the second peak value voltage. A terminal of the fourth voltage-dividing resistor is coupled to another terminal of the third voltage-dividing resistor and the fourth voltage-dividing resistor outputs a second threshold voltage, and another terminal of the fourth voltage-dividing resistor is coupled to the second ground voltage, wherein a second voltage-dividing ratio is a resistor value of the fourth voltage-dividing resistor divided by a sum of resistor values of the third and the fourth voltage-dividing resistors, and the second threshold voltage is the second voltage-dividing ratio multiplied by the second peak value voltage.

In an embodiment of the present disclosure, the voltage trigger generating circuit includes a third comparator, a first AND gate, a fourth comparator, a second AND gate, and an OR gate. A positive input end of the third comparator receives the first threshold voltage, and a negative input end of the third comparator receives the first capacitor voltage. The first AND gate is coupled to an output terminal of the second logic signal and the third comparator, and the first AND gate outputs the first discharging pulse signal. A positive input end of the fourth comparator receives the second threshold voltage, and a negative input end of the fourth comparator receives the second capacitor voltage. The second AND gate is coupled to an output terminal of the first logic signal and the fourth comparator, and the second AND gate outputs the second discharging pulse signal. The OR gate is coupled to an output terminal of the first and the second AND gates to receive the first and the second discharging pulse signals. When the first or the second discharging pulse signal is a high level voltage, the OR gate outputs the switch cut-off pulse signal at the time to cut off the synchronous rectification switch before the next switching period starts.

In an embodiment of the present disclosure, an electronic apparatus is provided; the electronic apparatus includes a flyback power converter and a load. The flyback power converter is suitable for either a synchronous rectification under a continuous conduction mode (CCM) or a discontinuous conduction mode (DCM). The load is coupled to the flyback power converter to receive an output voltage.

In an embodiment of the present disclosure, when the flyback power converter performs the synchronous rectification, the flyback power converter operates alone on the secondary side of the transformer, and during the switching period, when the main switch signal is transformed into a low level voltage, the control signal is transformed into a high level voltage, and when the voltage of the sensing signal is lower than the predetermined threshold voltage, the control signal is transformed into a low level voltage to cut the synchronous rectification switch off earlier.

To sum up, the flyback power converter and the electronic apparatus provided by the present embodiment of the instant disclosure are able to prevent a problem of shooting-through from happening under a continuous conduction mode, and further to decrease a voltage stress and a current stress of the synchronous rectification switch. Furthermore, there is no need to enter any primary side signal to operate on a secondary side, and thus there is no need for a signal isolating transmission element such as a pulse transformer or a photo-coupler, and thus to achieve a higher power density for a circuit and a lower cost at the same time.

For further understanding of the present disclosure, reference is made to the following detailed description illustrating the embodiments and examples of the present disclosure. The description is only for illustrating the present disclosure, not for limiting the scope of the claim.

DETAILED DESCRIPTION OF PREFERRED EMBODIMENTS

Figure 1A:
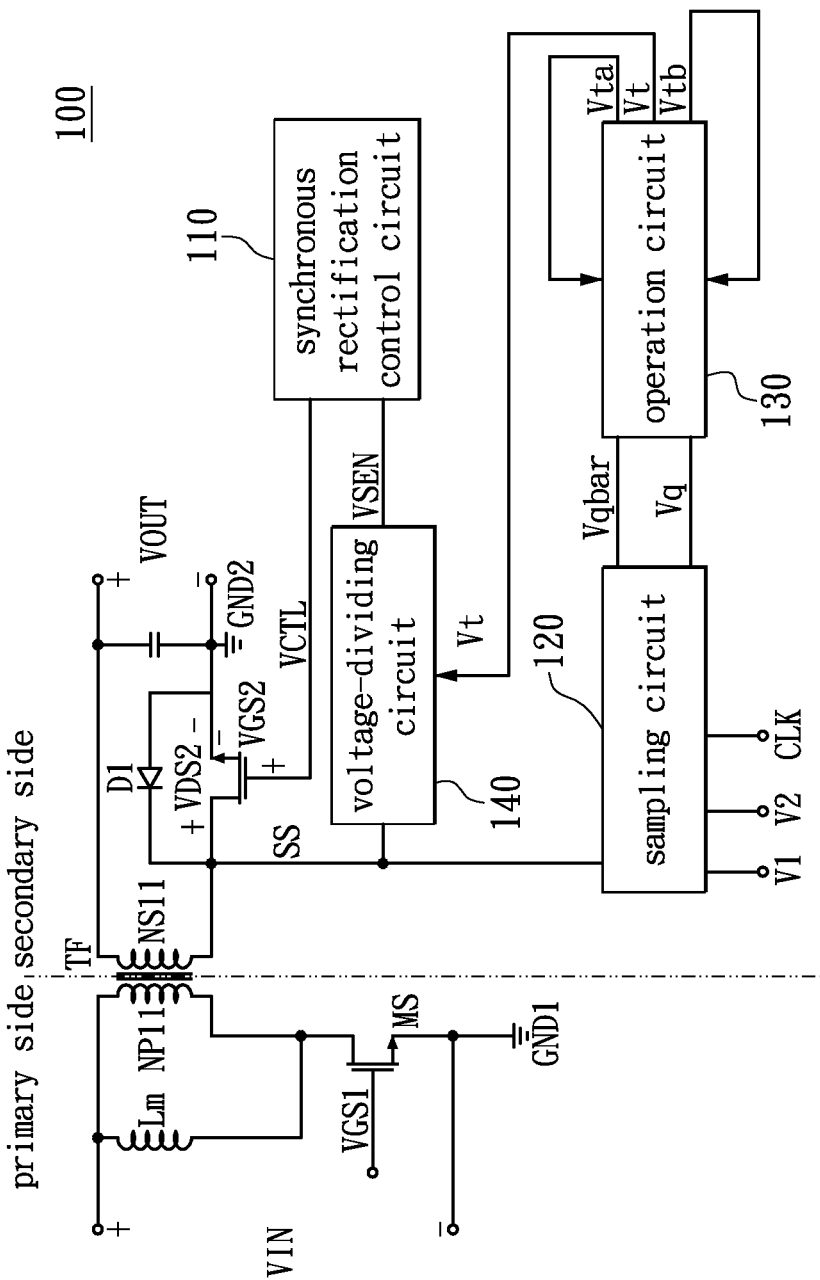
FIG. 1A shows a schematic diagram of a flyback power converter at a lower side according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[Embodiment of a Flyback Power Converter]

Referring to FIG. 1A, FIG. 1A shows a schematic diagram of a flyback power converter 100 at a lower side according to an embodiment of the instant disclosure; The flyback power converter 100 includes a transformer TF, a main switch MS, a synchronous rectification switch SS, a synchronous rectification control circuit 110, a sampling circuit 120, and an operation circuit 130. The transformer TF has a primary side and a secondary side (as shown in FIG. 1A), wherein both ends of a magnetizing inductance Lm are coupled to a winding NP11 on the primary side of the transformer TF. A drain of the main switch MS is coupled to the winding NP11 on the primary side of the transformer TF, and a source of the main switch MS is coupled to a first ground voltage GND1. The synchronous rectification switch SS is coupled to a winding NS11 on the secondary side of the transformer TF, and the drain and the source of the synchronous rectification switch SS are respectively coupled to a cathode and an anode of a body diode D1, wherein the cathode of the body diode D1 is coupled to the voltage-dividing circuit 140 and the sampling circuit 120, and the anode of the body diode D1 is coupled to a second ground voltage GND2. The synchronous rectification control circuit 110 is coupled to the synchronous rectification switch SS and the voltage-dividing circuit 140. The sampling circuit 120 is coupled to the drain of the synchronous rectification switch SS. The operation circuit 130 is coupled to the sampling circuit 120. In addition, the flyback power converter 100 is suitable for a synchronous rectification under either a continuous conduction mode or a discontinuous conduction mode, and transforms an input voltage VIN received into an output voltage so as to transmit to a load (not shown in FIG. 1A).

On the primary side of the fly-back power converter 100, a control end of the main switch MS receives a main switch switching signal VGS1 to control the main switch MS to be switched on or off so as to generate at least a switching period, wherein the main switch MS is a N-type metal oxide semiconductor transistor.

On the secondary side of the flyback power converter 100, the synchronous rectification switch SS is an N-type metal oxide semiconductor transistor, and a drain-to-source voltage VDS2 of the synchronous rectification switch SS is equal to the main switch switching signal VGS1 of the main switch.

The synchronous rectification control circuit 110 transmits a control signal VCTL to the end of the synchronous rectification switch SS according to a sensing signal VSEN received, wherein the sensing signal VSEN is generated due to a switch cut-off pulse signal Vt of the voltage-dividing circuit 140 and the drain-to-source voltage VDS2 of the synchronous rectification switch SS. If a voltage of the sensing signal VSEN is lower than a predetermined threshold voltage by the synchronous rectification control circuit 110, the synchronous rectification control circuit 110 outputs the control signal VCTL to the synchronous rectification switch SS to have the synchronous rectification switch SS enter into a cut-off state. When the synchronous rectification switch SS enters into a cut-off state, the body diode D1 is switched on to provide a current path for the magnetizing inductance Lm to release energy.

The sampling circuit 120, sampling the drain-to-source voltage VDS2 of the synchronous rectification switch SS, and receives a first voltage V1, a second voltage V2, and a clock signal CLK to generate a first logic signal Vqbar and a second logic signal Vq which are logically compensatory to each other.

The operation circuit 130 receives the first logic signal Vqbar and the second logic signal Vq and executes timing for charging/discharging according to the first logic signal Vqbar and the second logic signal Vq, and further outputs the switch cut-off pulse signal Vt to the voltage-dividing circuit 140. Furthermore, the operation circuit 130 also outputs a first discharging pulse signal Vta and a second discharging pulse signal Vtb and have the first discharging pulse signal Vta and the second discharging pulse signal Vtb feedback to accelerate timing for the discharging.

Figure 1B:
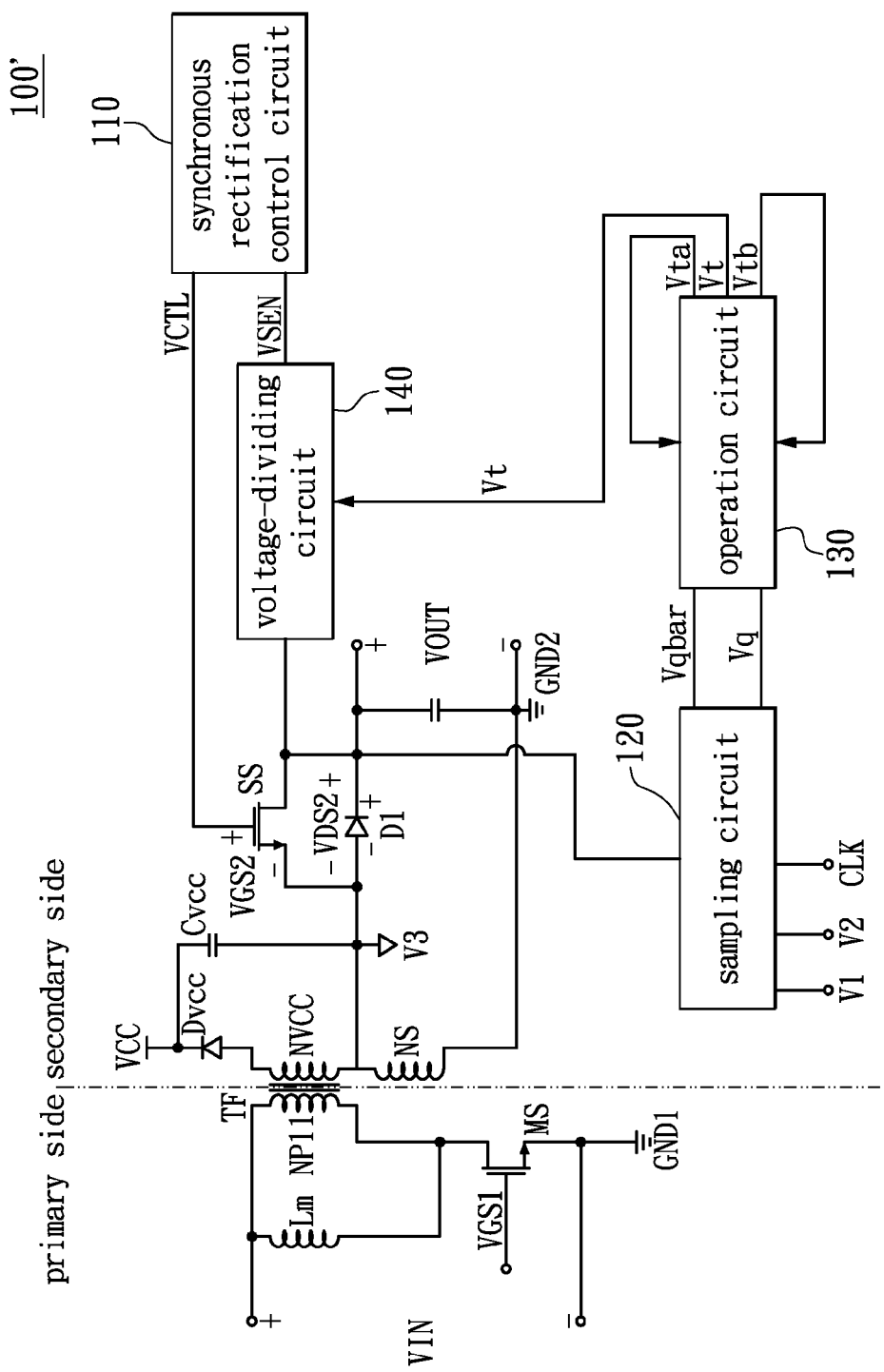
FIG. 1B shows a schematic diagram of a flyback power converter at a higher side according to an embodiment of the instant disclosure.

Moreover, the instant disclosure provides a flyback power converter at a higher side corresponding to the fly-back power converter at the lower side in the FIG. 1A. Referring to FIG. 1B, FIG. 1B shows a schematic diagram of a fly-back power converter at a higher side according to an embodiment of the instant disclosure. Different form the flyback power converter at the lower side in the FIG. 1A, a side winding of a transformer TF in a flyback power converter 100' is divided into two parts: a first side winding NVCC and a second side winding NS. In addition, a secondary side of the flyback power converter 100' is a winding diode Dvcc and a winding capacitor Cvcc.

A first terminal of the first side winding NVCC is coupled to an anode of the winding diode Dvcc. A cathode of the winding diode Dvcc is coupled to a system voltage VCC and a first terminal of the winding capacitor Cvcc. A second terminal of the winding capacitor Cvcc is coupled to a second terminal of the first side winding NVCC and a third voltage V3. A first terminal of the second side winding NS is coupled to the third voltage V3, and the second terminal of the second side winding NS is coupled to a second ground voltage GND2. It is to be noticed that, in the fly-back power converter 100', a synchronous rectification switch SS and a body diode D1 is coupled to each other in parallel, and a source of the synchronous rectification switch SS is coupled to a cathode of the body diode D1, a drain of the synchronous rectification switch SS is coupled to a cathode of the body diode D1 and the sampling circuit 120, wherein an output voltage VOUT is outputted from the drain of the synchronous rectification switch SS, and the synchronous rectification switch SS has a gate-to-source voltage VGS2 and a drain-to-source voltage VDS2. Moreover, identical to the flyback power converter at the lower side, the drain of the synchronous rectification switch SS is coupled to a voltage-dividing circuit 140, a gate of the synchronous rectification switch SS is coupled to a synchronous rectification control circuit 110.

Since the flyback power converter at the lower side in FIG. 1A and the flyback power converter at the higher side in FIG. 1B are symmetrical circuits, and thus operation mechanisms of the two are similar. Taking the flyback power converter at the lower side as an example, after people skilled in the arts understand a detailed operation of the flyback power converter at the lower side, it is assumed that the operation mechanism of the flyback power converter at the higher side is understood as well. The following description is a further teaching in a detailed operation of the flyback power converter 100.

Continuously referring to the FIG. 1A, under the continuous conduction mode CCM, when the main switch MS receives the main switch switching signal VGS1 so as to be switched on, the input voltage VIN crosses terminals of the winding NP11 on the primary side of the transformer TF due to a positive dotting, and thus the winding NS11 on the secondary side senses that a dotting of the voltage across the input voltage VIN(NS11/NP11) is positive, and the voltage plus the output voltage VOUT is the drain-to-source voltage VDS2 of the synchronous rectification switch SS, and which may be seen as a high level voltage logically; on the contrary, when the main switch MS receives the main switch switching signal VGS1 and is cut off, the body diode D1 will be forced to be switched on to provide the current path for the magnetizing inductance Lm to release energy; afterwards, the synchronous rectification switch SS will be switched on by the synchronous rectification control circuit 110 driven. If the body diode D1 and the drain-source on-state resistance are seen as an ideal condition, whether the current flows through the body diode D1 or the access of the synchronous rectification switch SS, the drain-to-source voltage VDS2 of the synchronous rectification switch SS may be seen as a low level voltage logically.

Accordingly, a signal waveform of the drain-to-source voltage VDS2 of the synchronous rectification switch SS may synchronously show a waveform of the main switch switching signal VGS1 on the primary side, and thus the flyback power converter 100 of the instant disclosure is able to operate alone on the secondary side without any primary side signal entered. In other words, there is no need for a signal isolating transmission element such as a pulse transformer or a photocoupler, and thus to achieve a higher power density for a circuit and a lower cost at the same time.

In addition, when a switching period starts, the main switch switching signal VGS1 is a high level voltage (which means the drain-to-source voltage VDS2 is also a high level voltage). In the present embodiment, the flyback power converter 100 samples the drain-source voltage VDS2 of the synchronous rectification switch SS with the sampling circuit 120, and the sampling circuit 120 outputs the first logic signal Vqbar and the second logic signal Vq, which are logically compensatory, according to the first voltage V1, second voltage V2, and the clock signal CLK, wherein the clock signal CLK and the main switch switching signal VGS1 are synchronous, and the first voltage V1 and the second voltage V2 may be reference voltages predetermined by the designer. Afterwards, the operation circuit 130 receives the first logic signal Vqbar and the second logic signal Vq, and executes the charging/discharging for timing according to the first logic signal Vqbar and the second logic signal Vq and outputs the switch cut-off pulse signal Vt to the voltage-dividing circuit 140. During this time period, the switch cut-off pulse signal Vt is a low level voltage.

When the main switch switching signal VGS1 is transformed from the high level voltage into a low level voltage, (which means, the drain-to-source voltage VDS2 is transformed into a low level voltage synchronously), the synchronous rectification control circuit 110 transforms the control signal VCTL from a low level voltage to be as a high level voltage according to the sensing signal VSEN. In other words, the gate-to-source voltage VGS2 of the synchronous rectification switch SS is a high level voltage. As a result, the main switch MS is in a switched-off state, while the synchronous rectification switch SS is in a switched-on state. It is to be clarified that when the first logic signal Vqbar or the second logic signal Vq is a low level voltage, the operation circuit 130 executes timing for the discharging; when the first logic signal Vqbar or the second logic signal Vq is a high level voltage, the operation circuit 130 executes timing for the charging. Since the first logic signal Vqbar and the second logic signal Vq are logically compensatory signals, the operation circuit 130 executes timing for both charging and discharging. Therefore, when the discharging of the operation circuit 130 is lower than timing threshold voltage, the operation circuit 140 outputs the first discharging pulse signal Vta or the second discharging pulse signal Vtb and have both the signals fed back to accelerate the discharging; in the meantime, the operation circuit 130 outputs the switch cut-off pulse signal Vt to the voltage-dividing circuit 140. Afterwards, the voltage-dividing circuit 140 outputs the sensing signal VSEN to the synchronous rectification control circuit 110 according to the drain-to-source voltage VDS2 and the switch cut-off pulse signal Vt. If the voltage of the sensing signal VSEN is lower than the predetermined threshold voltage, the synchronous rectification control circuit 110 transmits the control signal VCTL to the synchronous rectification switch SS to cut off the synchronous rectification switch SS before the next switching period starts; which means, the voltage of the control signal VCTL is transformed from the high level voltage into the low level voltage. Finally, when the switch cut-off pulse signal Vt is reduced from the high level voltage to the low level voltage, the flyback power converter 100 enters into the next switching period.

Based on the above, the flyback power converter 100 of the present embodiment is able to prevent a problem of shooting-through from happening under a continuous conduction mode, and further to decrease a voltage stress and a current stress of the synchronous rectification switch, and thus to achieve a higher power density for a circuit and a lower cost at the same time.

In addition, under the discontinuous conduction mode (DCM), the absolute value of the drain-to-source voltage VDS2 of the synchronous rectification switch SS decreases with the voltage of the magnetizing inductance Lm. Once the voltage of the sensing signal VSEN is lower than the predetermined threshold voltage in the operation circuit 110, the synchronous rectification switch SS is cut off by the synchronous rectification control circuit 110 driven. Circuit blocks of the flyback power converter 100 operating under the discontinuous conduction mode may lead to the switch cut-off pulse signal Vt generated when operate at the same time; however, due to a natural characteristic of the discontinuous conduction mode, timing of the absolute value of the drain-to-source voltage VDS2 of the synchronous rectification switch SS decreasing with the voltage of the magnetizing inductance Lm is earlier than the switch cut-off pulse signal Vt shown as the high level voltage. As a result, a control of cutting off the synchronous rectification switch SS is determined by the absolute value of the drain-to-source voltage VDS2. Even under a variable frequency mode, the flyback power converter 100 of the instant disclosure is still able to operate under the discontinuous conduction mode.

To present more operation details of the flyback power converter 100 of the instant disclosure, there are at least one embodiment for further instruction as the below.

In the following embodiments, there are only parts different from the embodiment in the FIG. 1A described, and the omitted parts are indicated to be the same to the embodiment in the FIG. 1A. In addition, to instruct easily, similar referred numbers or symbols are indicated to be elements alike.

[Embodiment of a Flyback Power Converter]

Figure 2:
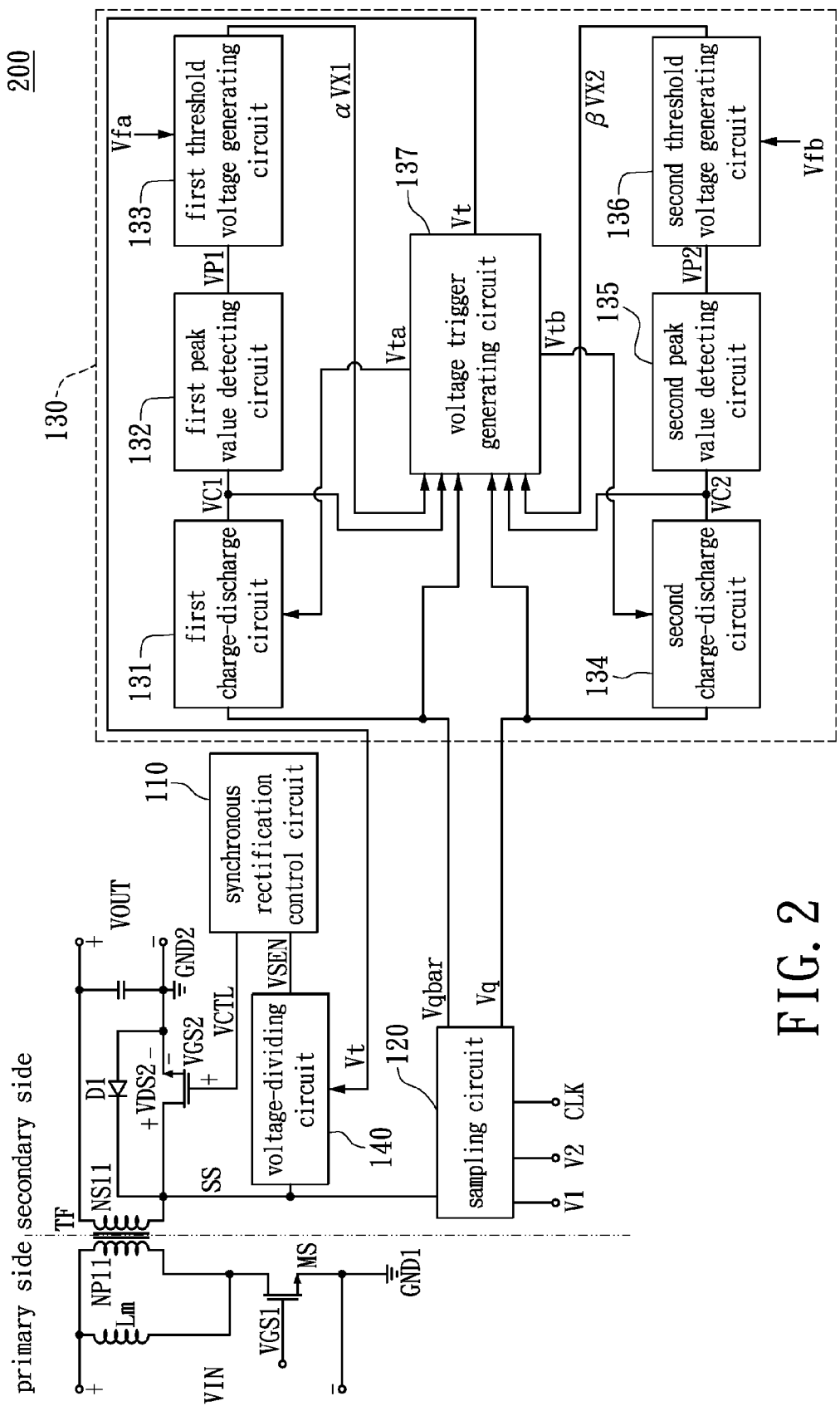
FIG. 2 shows a block diagram of a flyback power converter at a lower side according to an embodiment of the instant disclosure.
Figure 3:
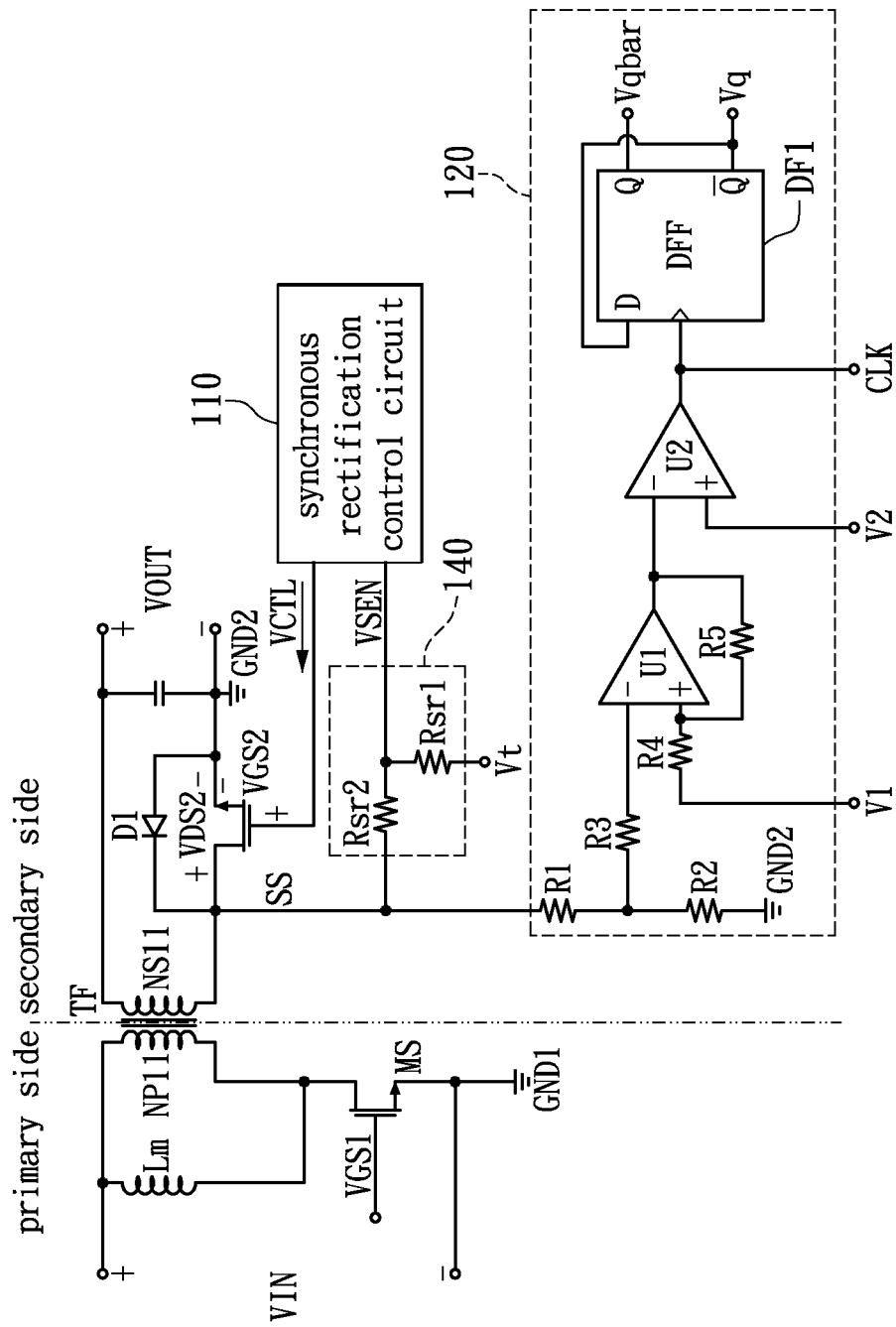
FIG. 3 shows a detailed circuit diagram of a sampling circuit according to the embodiment of the instant disclosure.

Referring to FIG. 2, FIG. 2 shows a block diagram of a flyback power converter 200 at a lower side according to an embodiment of the instant disclosure.

Different from the embodiment of the FIG. 1A, in the present embodiment, an operation circuit 130 includes a first charge-discharge circuit 131, a first peak value detecting circuit 132, a first threshold voltage generating circuit 133, a second charge-discharge circuit 134, a second peak value detecting circuit 135, a second threshold voltage generating circuit 136, a voltage trigger generating circuit 137. It is worth mentioning that the first charge-discharge circuit 131, the first peak value detecting circuit 132, and the first threshold voltage generating circuit 133 corresponding to the second charge-discharge circuit 134, the second peak value detecting circuit 135, and the second threshold voltage generating circuit 136 is for the fly-back power converter to be able to be operated under a dual-slope mode; in other words, when the first charge-discharge circuit 131 executes charging/discharging, the second charge-discharge circuit 134 executes discharging/charging correspondingly so that the flyback power converter 200 is able to maintain a function of timing in a next switching period.

The first charge-discharge circuit 131 is coupled to a sampling circuit 120, the first peak value detecting circuit 132 is coupled to the first charge-discharge circuit 131, and the first threshold voltage generating circuit 133 is coupled to the first peak value detecting circuit 132. The second charge-discharge circuit 134 is coupled to the sampling circuit 120, and the second peak value detecting circuit 135 is coupled to the second charge-discharge circuit 134, and the second threshold voltage generating circuit 136 is coupled to the second peak value detecting circuit 135. The voltage trigger generating circuit 137 is coupled to the sampling circuit 120, the first charge-discharge circuit 131, the second charge-discharge circuit 134, first threshold voltage generating circuit 133, second threshold voltage generating circuit 136, and a voltage-dividing circuit 140.

In the present embodiment, the first charge-discharge circuit 131 receives a first logic signal Vqbar to execute timing for charging/discharging, and outputs a first capacitor voltage VC1. The first peak value detecting circuit 132 receives the first capacitor voltage VC1 and outputs a first DC voltage VP1, wherein the first DC voltage VP1 is lower than a peak value of the first capacitor voltage VC1. The first threshold voltage generating circuit 133 receives the first DC voltage VP1 and a first compensation voltage Vfa so as to generate a first peak value voltage, and further outputs a first threshold voltage $\alpha$VX1 through a first voltage-dividing ratio, wherein the first threshold voltage $\alpha$VX1 is timing threshold voltage inside an operation circuit 130, and the first peak value voltage is the peak value of the first capacitor voltage VC1.

Likewise, the second charge-discharge circuit 134 receives the second logic signal Vq to execute timing of the charging/discharging, and outputs a second capacitor voltage VC2. The second peak value detecting circuit 135 receives the second capacitor voltage VC2 and outputs a second DC voltage VP2, wherein the second DC voltage VP2 is lower than a peak value of the second capacitor voltage. The second threshold voltage generating circuit 136 receives the second DC voltage VP2 and a second compensation voltage Vfb to generate a second peak value voltage so as to output a second threshold voltage $\beta$VX2 through a second voltage-dividing ratio, wherein the second threshold voltage $\beta$VX2 is timing threshold voltage inside the operation circuit 130, and the first peak value voltage is a peak value of the second capacitor voltage VC2.

The voltage trigger generating circuit 137 receives the first logic signal Vqbar, the second logic signal Vq, the first capacitor voltage VC1, the second capacitor voltage VC2, the first threshold voltage $\alpha$VX1, and the second threshold voltage $\beta$VX2 so as to accordingly output a switch cut-off pulse signal Vt, a first discharging pulse signal Vta, and a second discharging pulse signal Vtb. Furthermore, when the first capacitor voltage VC1 is lower than the first threshold voltage $\alpha$VX1, the voltage trigger generating circuit 137 outputs the first discharging pulse signal Vta to the first charge-discharge circuit 131 so as to reduce the first capacitor voltage VC1 until being a zero voltage. On the other hand, when the second capacitor voltage VC2 is lower than the second threshold voltage $\beta$VX2, the voltage trigger generating circuit 137 outputs the second discharging pulse signal Vtb to the second charge-discharge circuit 134 so as to reduce the second capacitor voltage VC2 until being a zero voltage. It is worth mentioning that when the voltage trigger generating circuit 137 outputs the first discharging pulse signal Vta or the second discharging pulse signal Vtb, the voltage trigger generating circuit 137 also outputs the switch cut-off pulse signal Vt, so as to cut off the synchronous rectification switch SS before the next switching period starts.

There is further instruction in teaching a detailed operation of the flyback power converter 200 as written below.

Continuously referring to FIG. 2, in the present embodiment, under a continuous conduction mode, when the main switch MS receives a main switch switching signal VGS1 and thus being switched on, an input voltage VIN crosses terminals of the winding NP11 on the primary side of the transformer TF due to a positive dotting, and thus the winding NS11 on the secondary side senses that a dotting of the voltage across the input voltage VIN(NS11/NP11) is positive, and the voltage plus the output voltage VOUT will be the drain-to-source voltage VDS2 of the synchronous rectification switch SS, and which may be seen as a high level voltage logically; on the contrary, when the main switch MS receives the main switch switching signal VGS1 and being cut off, the body diode D1 will be forced to be switched on to provide the current path for the magnetizing inductance Lm to release energy; afterwards, the synchronous rectification switch SS will be switched on by the synchronous rectification control circuit 110 driven. If the body diode D1 and the drain-source on-state resistance are seen as an ideal condition, whether the current flows through the body diode D1 or an access of the synchronous rectification switch SS, the drain-to-source voltage VDS2 of the synchronous rectification switch SS may be seen as a low level voltage.

Based on the above, a signal waveform of the drain-to-source voltage VDS2 of the synchronous rectification switch SS may simultaneously show waveform of the main switch switching signal VGS1 on the primary side, and thus the flyback power converter 200 of the instant disclosure is able to operate alone on the secondary side without any primary side signal entered. In other words, there is no need for a signal isolating transmission element such as a pulse transformer or a photocoupler, and thus to achieve a higher power density for a circuit and a lower cost at the same time.

In addition, when a switching period starts, the main switch switching signal VGS1 is a high level voltage (which means the drain-to-source voltage VDS2 is also a high level voltage). In the present embodiment, the flyback power converter 200 samples the drain-source voltage VDS2 of the synchronous rectification switch SS with the sampling circuit 120, and the sampling circuit 120 outputs the first logic signal Vqbar and the second logic signal Vq, which are logically compensatory, according to the first voltage V1, the second voltage V2 and the clock signal CLK. It is to be noticed that the clock signal CLK and the main switch switching signal VGS1 are synchronous; which means the same signal waveform is shared.

Before further instruction, it is to be clarified that when the first logic signal Vqbar or the second logic signal Vq is a low level voltage, the first charge-discharge circuit 131 or the second charge-discharge circuit 134 correspondingly executes timing for the discharging; when the first logic signal Vqbar or the second logic signal Vq is a high level voltage, the first charge-discharge circuit 131 or the second charge-discharge circuit 134 correspondingly executes timing for the charging. During the switching period, it is assumed that the first logic signal Vqbar is a high level voltage and the second logic signal Vq is a low level voltage. Then in the "next switching period," the first logic signal Vqbar is a low level voltage and the second logic signal Vq is a high level voltage.

Afterwards, the first charge-discharge circuit 131 receives a first logic signal Vqbar of the high level voltage and accordingly executes timing for charging, and also outputs a first capacitor voltage VC1 to the first peak-value detecting circuit 132 and the voltage trigger generating circuit 137 at the same time, wherein the first capacitor voltage VC1 increases from a zero voltage to the first peak value voltage. The second charge-discharge circuit 134 receives the second logic signal Vq of the low level voltage, and accordingly executes timing for discharging, and outputs the second capacitor voltage VC2 to the second peak-value detecting circuit 135 and the voltage trigger generating circuit 137, wherein the second capacitor voltage VC2 reduces from the first peak value voltage until being a zero voltage.

Furthermore, the first peak-value detecting circuit 132 detects the increasing peak value of the first capacitor voltage VC1 and outputs the first DC voltage VP1 to the first threshold voltage generating circuit 133. Due to a voltage consumption by the elements of the first peak-value detecting circuit 132 built inside, the first DC voltage VP1 detected is lower than the peak value of the first capacitor voltage VC1. Likewise, the second peak-value detecting circuit 135 detects the decreasing peak value of the second capacitor voltage VC2 and outputs the second DC voltage VP2 to the second threshold voltage generating circuit 136. Due to a voltage consumption by the elements of the second peak-value detecting circuit 135 built inside, the second DC voltage VP2 detected is lower than the peak value of the second capacitor voltage VC2.

When the first threshold voltage generating circuit 133 receives the first DC voltage VP1, the first threshold voltage generating circuit 133 accordingly compensates the first DC voltage VP1 with the first compensation voltage Vfa, and have the first DC voltage VP1 compensated until reaching the first peak value voltage, wherein the first peak value voltage VX1 is the peak value of the first capacitor voltage VC1. Afterwards, the first threshold voltage generating circuit 133 outputs the first threshold voltage αVX1 through the first voltage-dividing ratio and transmits the first threshold voltage αVX1 to the voltage trigger generating circuit 137. In other words, the first threshold voltage αVX1 is equal to the first voltage-dividing ratio multiplied by the first peak value voltage VX1, wherein the designer may set the first voltage-dividing ratio according to a circuit designing demand or an actual application demand.

On the other hand, when the second threshold voltage generating circuit 136 receives the second DC voltage VP2, the second threshold voltage generating circuit 136 accordingly compensates the second DC voltage VP2 with the second compensation voltage Vfb, and have the second DC voltage VP2 compensated until reaching the first peak value voltage, wherein the second peak value voltage VX2 is the peak value of the second capacitor voltage VC2. Afterwards, the second threshold voltage generating circuit 136 outputs the second threshold voltage βVX2 through the second voltage-dividing ratio and transmits the second threshold voltage βVX2 to the voltage trigger generating circuit 137. In other words, the second threshold voltage βVX2 is equal to the second voltage-dividing ratio multiplied by the second peak value voltage VX2, wherein the designer may set the second voltage-dividing ratio according to a circuit designing demand or an actual application demand.

When the main switch switching signal VGS1 is transformed from the high level voltage as a low level voltage, (which means, the drain-to-source voltage VDS2 is transformed into a low level voltage synchronously), the synchronous rectification control circuit 110 transforms the control signal VCTL from a low level voltage to be as a high level voltage according to the sensing signal VSEN. In other words, the gate-to-source voltage VGS2 of the synchronous rectification switch SS is a high level voltage. As a result, the main switch MS is in a switched-off state, while the synchronous rectification switch SS is in a switched-on state.

When the second capacitor voltage VC2 of the second charge-discharge circuit 134 is discharged until the voltage is lower than the second threshold voltage βVX2, the voltage trigger generating circuit 137 outputs the second discharging pulse signal Vtb to the second charge-discharge circuit 134 to accelerate the second capacitor voltage VC2 to be discharged until being a zero voltage. At the moment, the voltage trigger generating circuit 137 outputs the switch cut-off pulse signal Vt to the voltage-dividing circuit 140. Afterwards, the voltage-dividing circuit 140 outputs the sensing signal VSEN to the synchronous rectification control circuit 110 according to the drain-to-source voltage VDS2 and the switch cut-off pulse signal Vt. If the voltage of the sensing signal VSEN is lower than the predetermined threshold voltage, the synchronous rectification control circuit 110 transmits the control signal VCTL to the synchronous rectification switch SS to have the synchronous rectification switch SS cut off before the next switching period; which means, the voltage of the control signal VCTL is transformed from the high level voltage to the low level voltage. Finally, when the switch cut-off pulse signal Vt is transformed from the high level voltage into the low level voltage, the flyback power converter 200 enters into a "next switching period."

During the "next switching period," the first logic signal Vqbar is the low level voltage and the second logic signal Vq is the high level voltage; therefore, when the first charge-discharge circuit 131 executes timing for the discharging, the second charge-discharge circuit 134 executes timing for the charging, and the rest of the operation mechanism is similar as recited above, and thus it is not repeated thereto.

Based on the above, the flyback power converter 200 of the instant disclosure is able to prevent a problem of shooting-through from happening under a continuous conduction mode, and further to decrease a voltage stress and a current stress of the synchronous rectification switch. Furthermore, there is no need to enter any primary side signal to operate on a secondary side, and thus there is no need for a signal isolating transmission element such as a pulse transformer or a photocoupler, and thus to achieve a higher power density for a circuit and a lower cost at the same time.

To present more operation details of the flyback power converter 200 of the instant disclosure, there are more drawings provided for further instruction as the below.

In the following embodiments, there are only parts different from the embodiment in the FIGS. 1A and 2 described, and the omitted parts are indicated to be the same to the embodiment in the FIGS. 1A and 2. In addition, to instruct easily, similar referred numbers or symbols are indicated to be elements alike.

[Embodiment of a Flyback Power Converter]

Figure 4:
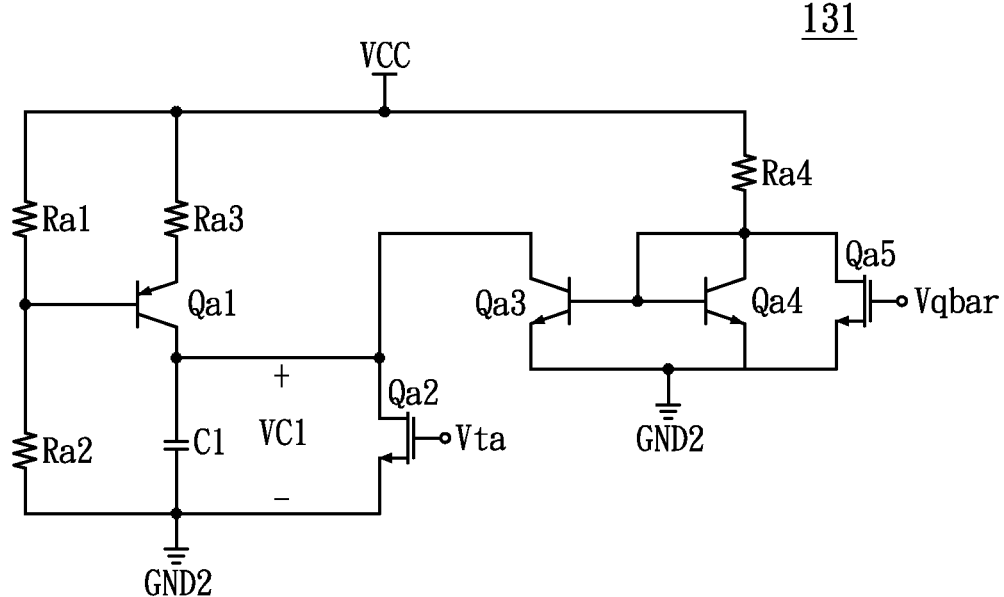
FIG. 4 shows a detailed circuit diagram of a first charge-discharge circuit according to the embodiment of the instant disclosure.
Figure 5:
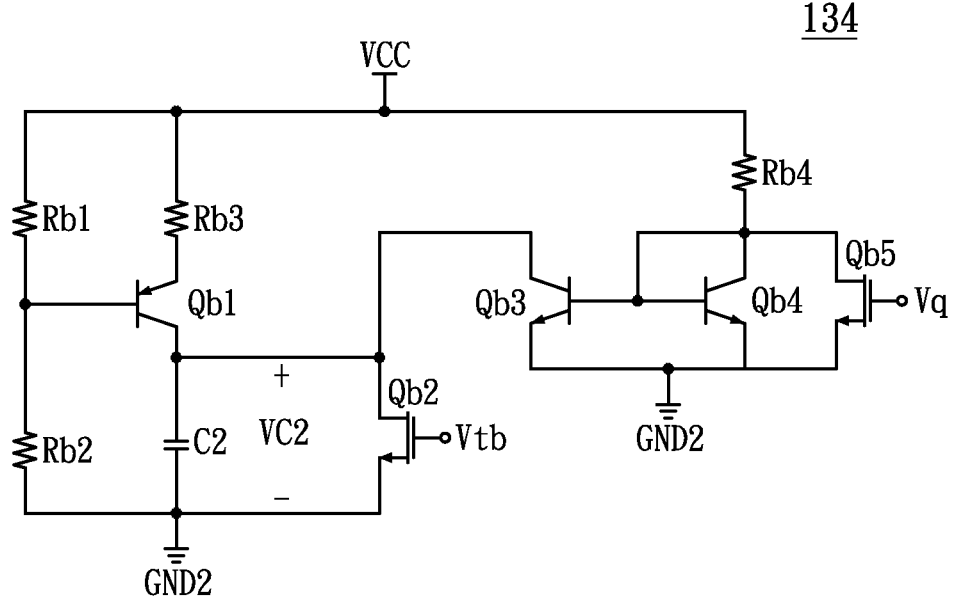
FIG. 5 shows a detailed circuit diagram of a second charge-discharge circuit according to the embodiment of the instant disclosure.
Figure 6:
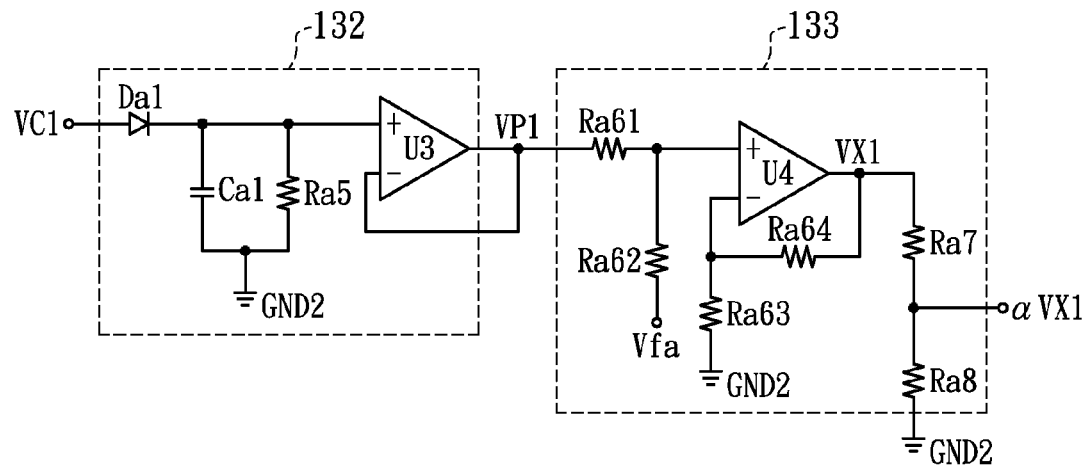
FIG. 6 shows a detailed circuit diagram of a first peak value detecting circuit and a first threshold voltage generating circuit according to the embodiment of the instant disclosure.
Figure 7:
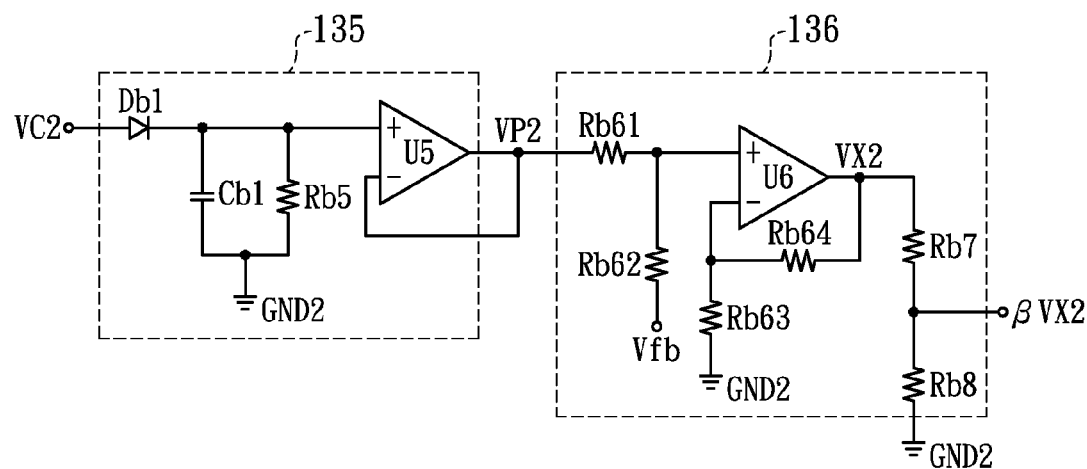
FIG. 7 shows a detailed circuit diagram of a second peak value detecting circuit and a second threshold voltage generating circuit according to the embodiment of the instant disclosure.
Figure 8:
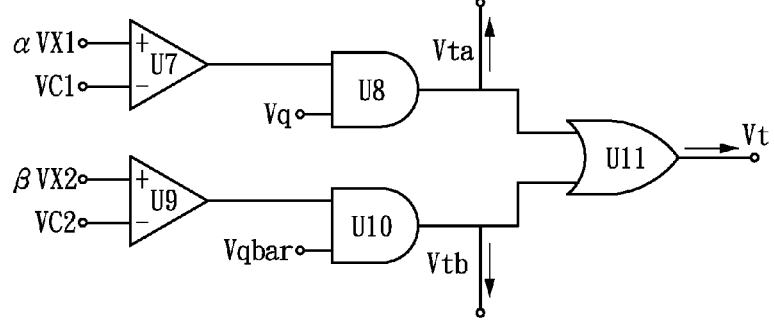
FIG. 8 shows a schematic diagram of a voltage trigger generating circuit according to the embodiment of the instant disclosure.

Referring to FIGS. 3-8, FIG. 3 shows a detailed circuit diagram of a sampling circuit 120 according to the embodiment of the instant disclosure. FIG. 4 shows a detailed circuit diagram of a first charge-discharge circuit 131 according to the embodiment of the instant disclosure. FIG. 5 shows a detailed circuit diagram of a second charge-discharge circuit 134 according to the embodiment of the instant disclosure. FIG. 6 shows a detailed circuit diagram of a first peak value detecting circuit 132 and a first threshold voltage generating circuit according 133 to the embodiment of the instant disclosure. FIG. 7 shows a detailed circuit diagram of a second peak value detecting circuit 135 and a second threshold voltage generating circuit 136 according to the embodiment of the instant disclosure. FIG. 8 shows a schematic diagram of a voltage trigger generating circuit 137 according to the embodiment of the instant disclosure.

Different from the embodiment in the FIG. 2, a voltage-dividing circuit 140 includes a first sensing resistor Rsr1 and a second sensing resistor Rsr2. A sampling circuit 120 includes a first resistor R1, a second resistor R2, a third resistor R3, a fourth resistor R4, a first comparator U1, a fifth resistor R5, a second comparator U2, and a D-type flip-flop DF1. The first charge-discharge circuit 131 includes a first charging resistor Ra1, a second charging resistor Ra2, a third charging resistor Ra3, a first transistor Qa1, a first timing capacitor C1, a second transistor Qa2, a third transistor Qa3, a fourth transistor Qa4, a first discharging resistor Ra4, and a fifth transistor Qa5. The second charge-discharge circuit 134 includes a fourth charging resistor Rb1, a fifth charging resistor Rb2, a sixth charging resistor Rb3, a sixth transistor Qb1, a second timing capacitor C2, a seventh transistor Qb2, an eighth transistor Qb3, a ninth transistor Qb4, a second discharging resistor Rb4, and a tenth transistor Qb5.

The first peak-value detecting circuit 132 includes a first diode Da1, a first storing capacitor Ca1, a third discharging resistor Ra5, and a first amplifier U3. The first threshold voltage generating circuit 133 includes a first adder resistor Ra61, a second adder resistor Ra62, a second amplifier U4, a third adder resistor Ra63, a fourth adder resistor Ra64, a first voltage-dividing resistor Ra7, and a second voltage-dividing resistor Rab. The second peak-value detecting circuit 135 includes a second diode Db1, a second storing capacitor Cb1, a fourth discharging resistor Rb5, and a third amplifier U5. The second threshold voltage generating circuit 136 includes a fifth adder resistor Rb61, a sixth adder resistor Rb62, a fourth amplifier U6, a seventh adder resistor Rb63, an eighth adder resistor Rb64, a third voltage-dividing resistor Rb7, and a fourth voltage-dividing resistor Rb8. The voltage trigger generating circuit 137 includes a third comparator U7, a first AND gate U8, a fourth comparator U9, a second AND gate U10, and an OR gate U11.

A terminal of the second sensing resistor Rsr2 is coupled to a drain of a synchronous rectification switch SS, and another terminal of the second sensing resistor Rsr2 is coupled to a terminal of the first sensing resistor Rsr1 and the second sensing resistor Rsr2 outputs a sensing signal VSEN to the synchronous rectification control circuit 110. Another terminal of the first sensing resistor Rsr1 receives a switch cut-off pulse signal Vt. A terminal of the first resistor R1 is coupled to the drain of the synchronous rectification switch SS. A terminal of the second resistor R2 is coupled to another terminal of the first resistor, and another terminal of the second resistor R2 is coupled to a second ground voltage GND2. A terminal of the third resistor R3 is coupled to another terminal of the first resistor R1. A terminal of the fourth resistor R4 receives a first voltage V1. A negative input end of the first comparator U1 is coupled to another terminal of the third resistor, and a positive input end of the first comparator U1 is coupled to another terminal of the fourth resistor R4. A terminal of the fifth resistor R5 is coupled to the positive input end of the first comparator U1, and another terminal of the fifth resistor R5 is coupled to an output terminal of the first comparator U1. A negative input end of the second comparator U2 is coupled to the output terminal of the first comparator U1, and a positive input end of the second comparator U2 receives a second voltage V2. A data input end of the D-type flip-flop DF1 is coupled to a data anti-output end of the D-type flip-flop DF1, and a data output end of the D-type flip-flop DF1 outputs a first logic signal Vqbar, and the data anti-output end of the D-type flip-flop DF1 anti-outputs a second logic signal Vq, and a clock input end of the D-type flip-flop DF1 is coupled to the output end of the second comparator U2 and receives a clock signal CLK.

A terminal of the charging resistor Ra2 is coupled to another terminal of the first charging resistor Ra1, and another terminal of the second charging resistor Ra2 is coupled to the second ground voltage GND2. A terminal of the third charging resistor Ra3 is coupled to a system voltage VCC. A base of the first transistor Qa1 is coupled to another terminal of the first charging resistor Ra1, and an emitter of the first transistor Qa1 is coupled to another terminal of the third charging resistor Ra3. A terminal of the first timing capacitor C1 is coupled to the collector of the first transistor Qa1, and another terminal of the first timing capacitor C1 is coupled to the second ground voltage GND2, wherein a first charging current source is consisted of the first charging resistor Ra1, the second charging resistor Ra2, the third charging resistor Ra3, and the first transistor Qa1. A drain of the second transistor Qa2 is coupled to another terminal of the first timing capacitor C1, and a gate of the second transistor Qa2 receives a first discharging pulse signal Vta, and a source of the second transistor Qa2 is coupled to the second ground voltage GND2. A collector of the third transistor Qa3 is coupled to a terminal of the first timing capacitor C1, and an emitter of the third transistor Qa3 is coupled to the second ground voltage GND2. A base of the fourth transistor Qa4 is coupled to a base of the third transistor Qa3, and an emitter of the fourth transistor Qa4 is coupled to the second ground voltage GND2. A terminal of the first discharging resistor Ra4 is coupled to the system voltage VCC, and another terminal of the first discharging resistor Ra4 is coupled to a collector and the base of the fourth transistor Qa4. A drain of the fifth transistor Qa5 is coupled to another terminal of the first discharging resistor Ra4, and a gate of the fifth transistor Qa5 receives the first logic signal Vqbar, and a source of the fifth transistor Qa5 is coupled to the second ground voltage GND2, wherein a first discharging current source is consisted of the third transistor Qa3, the fourth transistor Qa4, and the first discharging resistor Ra4.

A terminal of the fourth charging resistor Rb1 is coupled to the system voltage VCC. A terminal of the fifth charging resistor Rb2 is coupled to another terminal of the fourth charging resistor Rb1, and another terminal of the fifth charging resistor Rb2 is coupled to the second ground voltage GND2. A terminal of the sixth charging resistor Rb3 is coupled to the system voltage VCC. A base of the sixth transistor Qb1 is coupled to another terminal of the fourth charging resistor Rb1, and an emitter of the sixth transistor Qb1 is coupled to another terminal of the sixth charging resistor Rb3. A terminal of the second timing capacitor C2 is coupled to a collector of the sixth transistor Qb1, and another terminal of the second timing capacitor C2 is coupled to the second ground voltage GND2, wherein a second charging current source is consisted of the fourth charging resistor Rb1, the fifth charging resistor Rb2, the sixth charging resistor Rb3, and the sixth transistor Qb1. A drain of the seventh transistor Qb2 is coupled to a terminal of the second timing capacitor C2, and a gate of the seventh transistor Qb2 receives a second discharging pulse signal Vtb, and a source of the seventh transistor Qb2 is coupled to the second ground voltage GND2. A collector of the eighth transistor Qb3 is coupled to a terminal of the second timing capacitor C2, and an emitter of the eighth transistor Qb3 is coupled to the second ground voltage GND2. A base of the ninth transistor Qb4 is coupled to the base of the eighth transistor Qb3, and an emitter of the ninth transistor Qb4 is coupled to the second ground voltage GND2. A terminal of the second discharging resistor Rb4 is coupled to the system voltage VCC, and another terminal of the second discharging resistor Rb4 is coupled to a collector and the base of the ninth transistor Qb4. A drain of the tenth transistor Qb5 is coupled to another terminal of the second discharging resistor Rb4, and a gate of the tenth transistor Qb5 receives a second logic signal Vq, and a source of the tenth transistor Qb5 is coupled to the second ground voltage GND2, wherein a second discharging current source is consisted of the eighth transistor Qb3, the ninth transistor Qb4, and the second discharging resistor Rb4.

A terminal of the first storing capacitor Ca1 is coupled to a cathode of the first diode Da1, and another terminal of the first storing capacitor Ca1 is coupled to the second ground voltage GND2. The third discharging resistor Ra5 is coupled to the first storing capacitor Ca1 in parallel. A positive input end of the first amplifier U3 is coupled to a terminal of the first storing capacitor Ca1, and a negative input end of the first amplifier U3 is coupled to an output terminal of the first amplifier U3, wherein the output terminal of the first amplifier U3 outputs a first DC voltage VP1, and the first DC voltage VP1 is equal to a peak value of a first capacitor voltage VC1 minus a forward voltage of the first diode Da1. A terminal of the first adder resistor Ra61 receives the first DC voltage. A terminal of the second adder resistor Ra62 is coupled to another terminal of the first adder resistor Ra61, and another terminal of the second adder resistor Ra62 is coupled to the first compensation voltage Vfa, wherein the first compensation voltage Vfa is a forward voltage of the first diode Da1. A positive input end of the second amplifier U4 is coupled to another terminal of the first adder resistor Ra61. A terminal of the third adder resistor Ra63 is coupled to a negative input end of the second amplifier U4, and another terminal of the third adder resistor Ra63 is coupled to the second ground voltage GND2. A terminal of the fourth adder resistor Ra64 is coupled to a terminal of the third adder resistor Ra63, and another terminal of the fourth adder resistor Ra64 is coupled to an output terminal of the second amplifier U4, and the fourth adder resistor Ra64 outputs a first peak value voltage VX1 through the output terminal of the second amplifier U4, and the first peak value voltage VX1 is the peak value of the first capacitor voltage VC1. A terminal of the first voltage-dividing resistor Ra7 receives the first peak value voltage VX1. A terminal of the second voltage-dividing resistor Ra8 is coupled to another terminal of the first voltage-dividing resistor Ra7 and the second voltage-dividing resistor Ra8 outputs a first threshold voltage $\alpha VX1$, and another terminal of the second voltage-dividing resistor Ra8 is coupled to the second ground voltage GND2, wherein a first voltage-dividing ratio is a resistor value of the second voltage-dividing resistor Ra8 divided by a sum of the resistor values of the first and the second voltage-dividing resistors Ra7, Ra8, and the first threshold voltage $\alpha VX1$ is the first voltage-dividing ratio multiplied by the first peak value voltage VX1.

A terminal of the second storing capacitor Cb1 is coupled to a cathode of the second diode Db1, and another terminal of the second storing capacitor Cb1 is coupled to the second ground voltage GND2. The fourth discharging resistor Rb5 is coupled to the second storing capacitor Cb1 in parallel. A positive input end of the third amplifier U5 is coupled to another terminal of the second storing capacitor Cb1, and a negative input end of the third amplifier U5 is coupled to an output terminal of the third amplifier U5, wherein the output terminal of the third amplifier U5 outputs a second DC voltage VP2, and the second DC voltage VP2 is equal to a peak value of a second capacitor voltage VC2 minus a forward voltage of the second diode Db1. A terminal of the fifth adder resistor Rb61 receives a second DC voltage VP2. A terminal of the sixth adder resistor Rb62 is coupled to another terminal of the fifth adder resistor Rb61, and another terminal of the sixth adder resistor Rb62 is coupled to a second compensation voltage Vfb, wherein the second compensation voltage Vfb is a forward voltage of the second diode Db1. A positive input end of the fourth amplifier U6 is coupled to another terminal of the fifth adder resistor Rb61. A terminal of the seventh adder resistor Rb63 is coupled to a negative input end of the fourth amplifier U6, and another terminal of the seventh adder resistor Rb63 is coupled to the second ground voltage GND2. A terminal of the eighth adder resistor Rb64 is coupled to a terminal of the seventh adder resistor Rb63, and another terminal of the eighth adder resistor Rb64 is coupled to an output terminal of the fourth amplifier U6, and the eighth adder resistor Rb64 outputs a second peak value voltage VX2 through the output terminal of the fourth amplifier U6, and the second peak value VX2 voltage is the peak value of the second capacitor voltage VC2. A terminal of the third voltage-dividing resistor Rb7 receives the second peak value voltage VX2. A terminal of the fourth voltage-dividing resistor Rb8 is coupled to another terminal of the third voltage-dividing resistor Rb7 and the fourth voltage-dividing resistor Rb8 outputs a second threshold voltage $\beta VX2$, and another terminal of the fourth voltage-dividing resistor Rb8 is coupled to the second ground voltage GND2, wherein a second voltage-dividing ratio is a resistor value of the fourth voltage-dividing resistor Rb8 divided by a sum of resistor values of the third and the fourth voltage-dividing resistors Rb7, Rb8, and the second threshold voltage $\beta VX2$ is the second voltage-dividing ratio multiplied by the second peak value voltage VX2.

A positive input end of the third comparator U7 receives the first threshold voltage $\alpha VX1$, and a negative input end of the third comparator U7 receives the first capacitor voltage VC1. The first AND gate U8 is coupled to an output terminal of the second logic signal Vq and the third comparator U7, and the first AND gate U8 outputs the first discharging pulse signal Vta. A positive input end of the fourth comparator U9 receives the second threshold voltage $\beta VX2$, and a negative input end of the fourth comparator U9 receives the second capacitor voltage VC2. The second AND U10 gate is coupled to an output terminal of the first logic signal Vqbar and the fourth comparator U9, and the second AND gate U10 outputs the second discharging pulse signal Vtb. The OR gate U11 is coupled to an output terminal of the first and the second AND gates U8, U10.

Figure 9:
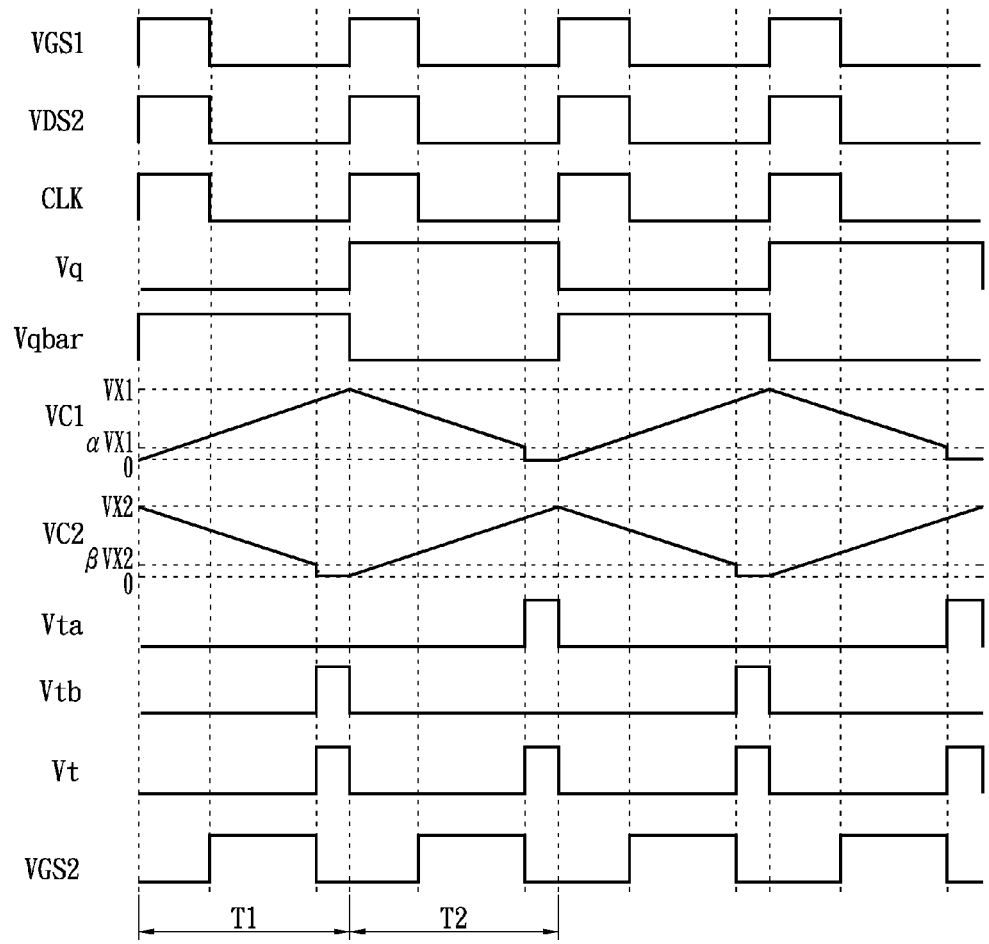
FIG. 9 shows a waveform diagram of a flyback power converter driven according to the embodiment of the instant disclosure.

Before further instruction, it is to be clarified that a waveform diagram in the FIG. 9 is referred for specific teaching of the instant disclosure. FIG. 9 shows a waveform diagram of the fly-back power converter driven according to the embodiment of the instant disclosure.

Under a continuous conduction mode, when the main switch MS receives a main switch switching signal VGS1 so as to be switched on, an input voltage VIN crosses terminals of a winding NP11 on a primary side of a transformer TF due to a positive dotting, and thus a winding NS11 on a secondary side senses that a dotting of the voltage across the terminals of the input voltage VIN(NS11/NP11) is positive, and the voltage plus an output voltage VOUT is a drain-to-source voltage VDS2 of the synchronous rectification switch SS, and which may be seen as a high level voltage logically; on the contrary, when the main switch MS receives the main switch switching signal VGS1 and is cut off, the body diode D1 will be forced to be switched on to provide a current path for a magnetizing inductance Lm to release energy; afterwards, the synchronous rectification switch SS will be switched on by the synchronous rectification control circuit 110 driven. If the body diode D1 and the drain-source on-state resistance are seen as an ideal condition, whether the current flows through the body diode D1 or the access of the synchronous rectification switch SS, a drain-to-source voltage VDS2 of the synchronous rectification switch SS may be seen as a low level voltage logically. Accordingly, a signal waveform of the drain-to-source voltage VDS2 of the synchronous rectification switch SS may synchronously show a waveform of the main switch switching signal VGS1 on the primary side, and thus the flyback power converter of the instant disclosure is able to operate alone on the secondary side without any primary side signal entered.

When a switching period T1 starts, the main switch switching signal VGS1 is a high level voltage (which means the drain-to-source voltage VDS2 is also a high level voltage. In the present embodiment, the flyback power converter samples the drain-to-source voltage VDS2 of the synchronous rectification switch SS with the resistors R1-R5, the comparators U1-U2, and the D-type flip-flop DF1 in the sampling circuit 120, and the sampling circuit 120 outputs the first logic signal Vqbar and the second logic signal Vq, which are logically compensatory, according to the first voltage V1, second voltage V2, and the clock signal CLK, wherein the clock signal CLK and the main switch switching signal VGS1 are synchronous, and the first voltage V1 and the second voltage V2 may be reference voltages predetermined by the designer.

Afterwards, the fifth transistor Qa5 in the first charge-discharge circuit 131 receives the first logic signal Vqbar of a high level voltage, and according to the first logic signal Vqbar, the first charge-discharge circuit 131 executes timing on first timing capacitor C1 for charging (a charging current flows from a collector of the first transistor Qa1) with the charging resistors Ra1-Ra3 and the first transistor Qa1, and also outputs the first capacitor voltage VC1 to the first peak-value detecting circuit 132 and the voltage trigger generating circuit 137, wherein the first capacitor voltage VC1 increases from a zero voltage to the first peak value voltage. In the meantime, the tenth transistor Qb5 in the second charge-discharge circuit 134 receives the second logic signal Vq of a low level voltage, and according to the second logic signal Vq, the second charge-discharge circuit 134 executes timing for discharging from the second timing capacitor C2 to the first discharging current source (a discharging current flows from a terminal of the second timing capacitor C2 to the collector of the eighth transistor Qb3), and also outputs the second capacitor voltage VC2 to the second peak-value detecting circuit 135 and the voltage trigger generating circuit 137, wherein the second capacitor voltage VC2 decreases from the second peak value voltage until being the zero voltage.

When the first peak-value detecting circuit 132 receives the first capacitor voltage VC1, the first peak-value detecting circuit 132 detects the increasing peak value of the first capacitor voltage VC1 and outputs the first DC voltage VP1 to the first threshold voltage generating circuit 133, wherein the configuration of the first amplifier U3 is a voltage follower. Due to a forward voltage of the first diode Da1 decreased, the first DC voltage VP1 detected outputted from the first amplifier U3 is lower than the peak value of the first capacitor voltage VC1. Likewise, when second peak-value detecting circuit 135 receives the second capacitor voltage VC2, the second peak-value detecting circuit 135 detects the increasing peak value of the second capacitor voltage VC2 and outputs the second DC voltage VP2 to the second threshold voltage generating circuit 135, wherein the configuration of the third amplifier U5 is the voltage follower. Due to a forward voltage of the second diode Db1 decreased, the second DC voltage VP2 detected outputted from the third amplifier U5 is lower than the peak value of the second capacitor voltage VC2.

In the present embodiment, the first threshold voltage generating circuit 133 and the second threshold voltage generating circuit 136 are non-inverting adders. When the first threshold voltage generating circuit 133 receives the first DC voltage VP1, the first threshold voltage generating circuit 133 accordingly compensates the first DC voltage VP1 with the first compensation voltage Vfa, and have the first DC voltage VP1 compensated until reaching the first peak value voltage VX1, wherein the first peak value voltage VX1 is the peak value of the first capacitor voltage VC1. In other words, the first threshold voltage generating circuit 133 executes an adder operation with the adder resistors Ra61-Ra64 and the second amplifier U4, and has the first peak value voltage VX1 outputted from the output terminal of the second amplifier U4. Afterwards, the first threshold voltage generating circuit 133 outputs the first threshold voltage αVX1 through the voltage-dividing circuit consisted of the first voltage-dividing resistor Ra7 and voltage-dividing resistor Ra8 to transmit the first threshold voltage αVX1 to the voltage trigger generating circuit 137, wherein the first voltage-dividing ratio is the resistor value of the second voltage-dividing resistor Ra8 divided by a sum of the resistor values of the first voltage-dividing resistor Ra7 and the second voltage-dividing resistor Ra8. In other words, the first threshold voltage αVX1 is equal to the first voltage-dividing ratio multiplied by the first peak value voltage VX1, wherein the designer may set the first voltage-dividing ratio according to a circuit designing demand or an actual application demand.

On the other hand, when the second threshold voltage generating circuit 136 receives the second DC voltage VP2, the second threshold voltage generating circuit 136 accordingly compensates the second DC voltage VP2 with the second compensation voltage Vfb, and have the second DC voltage VP2 compensated until reaching the second peak value voltage VX2, wherein the second peak value voltage VX2 is the peak value of the second capacitor voltage VC2. In other words, the second threshold voltage generating circuit 136 executes an adder operation with the adder resistors Rb61-Rb64 and the fourth amplifier U6, and has the second peak value voltage VX2 outputted from the output terminal of the fourth amplifier U6. Afterwards, the second threshold voltage generating circuit 136 outputs the second threshold voltage βVX2 through the voltage-dividing circuit consisted of the third voltage-dividing resistor Rb7 and the fourth voltage-dividing resistor Rb8 and transmits the second threshold voltage βVX2 to the voltage trigger generating circuit 137, wherein the second voltage-dividing ratio is the resistor value of the fourth voltage-dividing resistor Rb8 divided by a sum of the resistor values of the third voltage-dividing resistor Rb7 and the fourth voltage-dividing resistor Rb8. In other words, the second threshold voltage βVX2 is equal to the second voltage-dividing ratio multiplied by the second peak value voltage VX2, wherein the designer may set the second voltage-dividing ratio according to a circuit designing demand or an actual application demand.

Moreover, when the main switch switching signal VGS1 is transformed from the high level voltage to be as the low level voltage, (which means, the drain-to-source voltage VDS2 is transformed into a low level voltage synchronously), the synchronous rectification control circuit 110 transforms the control signal VCTL from a low level voltage to be as a high level voltage according to the sensing signal VSEN. In other words, the gate-to-source voltage VGS2 of the synchronous rectification switch SS is a high level voltage. As a result, the main switch MS is in a switched-off state, while the synchronous rectification switch SS is in a switched-on state.

When the second capacitor voltage VC2 of the second timing capacitor C2 discharges until being lower than the second threshold voltage βVX2 and the fourth comparator U9 determines that the second capacitor voltage VC2 that the voltage is lower than the second threshold voltage βVX2, the fourth comparator U9 outputs a high level voltage to the second AND gate U10; at the moment, since the first logic signal Vqbar is also the high level voltage, the second AND gate U10 outputs the second discharging pulse signal Vtb of the high level voltage to the second transistor Qa2 in the second charge-discharge circuit 134 to accelerate discharging the second capacitor voltage VC2 until being a zero voltage. Furthermore, the OR gate U11 receives the second discharging pulse signal Vtb of the high level voltage and also outputs the switch cut-off pulse signal Vt to the first sensing resistor Rsr1 of the voltage-dividing circuit 140 at the same time. Afterwards, the voltage-dividing circuit 140 senses the second sensing resistor Rsr2, the drain-to-source voltage VDS2 of the synchronous rectification switch SS through the first sensing resistor Rsr1, and the switch cut-off pulse signal Vt so as to output the sensing signal VSEN to the synchronous rectification control circuit 110 accordingly. If the voltage of the sensing signal VSEN is lower than the predetermined threshold voltage, the synchronous rectification control circuit 110 transmits the control signal VCTL to the synchronous rectification switch SS to cut off the synchronous rectification switch SS before the next switching period starts; which means, the voltage of the control signal VCTL is transformed from the high level voltage into the low level voltage. Finally, when the switch cut-off pulse signal Vt is reduced from the high level voltage to the low level voltage, the fly-back power converter enters into a next switching period T2.

During the "next switching period T2," the first logic signal Vqbar is the low level voltage and the second logic signal Vq is the high level voltage; therefore, when the first charge-discharge circuit 131 executes timing for the discharging, the second charge-discharge circuit 134 executes timing for the charging, and the rest of the operation mechanism is similar as recited above, and thus it is not repeated thereto. In addition, the operation mechanisms of the switching period T1 and the switching period T2 are repeatedly alternated.

Accordingly, the flyback power converter of the instant disclosure is able to prevent a problem of shooting-through from happening under a continuous conduction mode, and further to decrease a voltage stress and a current stress of the synchronous rectification switch. Furthermore, there is no need to enter any primary side signal to operate on a secondary side, and thus there is no need for a signal isolating transmission element such as a pulse transformer or a photocoupler, and thus to achieve a higher power density for a circuit and a lower cost at the same time.

[Embodiment of an Electronic Apparatus]

Figure 10:
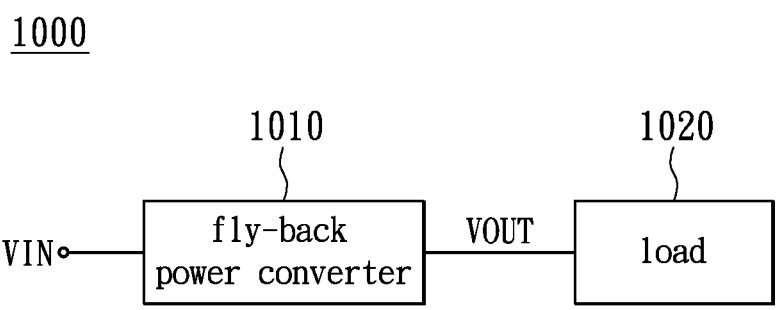
FIG. 10 shows a schematic diagram of an electronic apparatus according to the embodiment of the instant disclosure.

Referring to FIG. 10, FIG. 10 shows a schematic diagram of an electronic apparatus 1000 according to the embodiment of the instant disclosure. The electronic apparatus 1000 includes a flyback power converter 1010 and a load 1020. The flyback power converter 1010 may be one of flyback power converters 100, 100', 200 in the former embodiments, providing an output voltage VOUT to the load 1020. The electronic apparatus 1000 may be any kind of electronic apparatus such as a hand-held device or a portable device.

To sum up, the flyback power converter and the electronic apparatus provided by the present embodiments of the instant disclosure are able to prevent a problem of shooting-through from happening under a continuous conduction mode, and further to decrease a voltage stress and a current stress of the synchronous rectification switch. Furthermore, there is no need to enter any primary side signal to operate on a secondary side, and thus there is no need for a signal isolating transmission element such as a pulse transformer or a photocoupler, and thus to achieve a higher power density for a circuit and a lower cost at the same time.

In at least one of the embodiments of the instant disclosure, whether it is operated under a continuous conduction mode, discontinuous conduction mode, or even a variable frequency mode, the flyback power converter of the instant disclosure is still able to operate normally and independently on the secondary side.

The descriptions illustrated supra set fourth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A flyback power converter, suitable for a synchronous rectification, transforming an input voltage received into an output voltage, comprising:
    a transformer, having a primary side and a secondary side, wherein both ends of a magnetizing inductance are coupled to a winding on the primary side of the transformer;
    a main switch, having a control end for receiving a main switch switching signal to control the main switch to be switched on or off, and a drain of the main switch is coupled to the winding on the primary side of the transformer, and a source of the main switch is coupled to a first ground voltage;
    a synchronous rectification switch, coupled to a winding on the secondary side of the transformer, and a drain and a source of the synchronous rectification switch are respectively coupled to a cathode and an anode of a body diode, and a signal of a drain-to-source voltage of the synchronous rectification switch is equal to a main switch switching signal;
    a synchronous rectification control circuit, transmitting a control signal to the control end of the synchronous rectification switch according to a sensing signal received, wherein the sensing signal is generated by a voltage-dividing circuit according to a switch cut-off pulse signal and a signal of the drain-to-source voltage of the synchronous rectification switch;
a sampling circuit, coupled to the drain of the synchronous rectification switch so as to generate a first logic signal and a second logic signal; and
an operation circuit, coupled to the sampling circuit, receiving the first logic signal and the second logic signal and accordingly executing timing for charging/discharging, further outputting the switch cut-off pulse signal to the voltage-dividing circuit,
wherein if a voltage of the sensing signal is lower than a predetermined threshold voltage, the synchronous rectification switch enters into a cut-off state according to the control signal, and when the synchronous rectification switch is cut off, the body diode is switched on to provide a current path for the magnetizing inductance to release energy,
wherein when the first logic signal or the second logic signal is a low level voltage, the operation circuit executes timing for discharging;
when the first logic signal or the second logic signal is a high level voltage, the operation circuit executes timing for charging, wherein the first logic signal and the second logic signal are complementary logically.

2. The flyback power converter according to claim 1, wherein when the flyback power converter performs the synchronous rectification, the flyback power converter operates alone on the secondary side of the transformer.

3. The flyback power converter according to claim 1, wherein during a switching period, when the main switch signal is transformed into a low level voltage, the control signal is transformed into a high level voltage, and when the voltage of the sensing signal is lower than the predetermined threshold voltage, the control signal is transformed into a low level voltage to cut the synchronous rectification switch off earlier.

4. The flyback power converter according to claim 1, wherein when discharging until the voltage is lower than a timing threshold voltage, the operation circuit outputs the switch cut-off pulse signal to cut the synchronous rectification switch off, and when the switch cut-off pulse signal is transformed into the low level voltage, the main switch switching signal is transformed into a high level voltage.

5. The flyback power converter according to claim 1, wherein the sampling circuit further receives a clock signal so as to generate the first logic signal and the second logic signal, wherein the clock signal is synchronous to the main switch switching signal.

6. The flyback power converter according to claim 1, wherein the operation circuit comprising:
a first charge-discharge circuit, receiving the first logic signal to execute timing for charging/discharging, and outputs a first capacitor voltage;
a first peak value detecting circuit, coupled to the first charge-discharge circuit to receive the first capacitor voltage, and outputting a first direct current (DC) voltage, wherein the first DC voltage is lower than a peak value of the first capacitor voltage; and
a first threshold voltage generating circuit, coupled to the first peak value detecting circuit, receiving the first DC voltage and a first compensation voltage so as to generate a first peak value voltage, and further outputting a first threshold voltage through a first voltage-dividing ratio,
wherein the first threshold voltage is timing threshold voltage, and the first peak value voltage is the peak value of the first capacitor voltage.

7. The flyback power converter according to claim 6, wherein the operation circuit comprising:
a second charge-discharge circuit, receiving the second logic signal to execute timing for charging/discharging, and outputting a second capacitor voltage;
a second peak value detecting circuit, coupled to the second charge-discharge circuit to receive the second capacitor voltage, and outputting a second DC voltage, wherein the second DC voltage is lower than a peak value of the second capacitor voltage; and
a second threshold voltage generating circuit, coupled to the second peak value detecting circuit, receiving the second DC voltage and a second compensation voltage so as to generate a second peak value voltage, and further outputting a second threshold voltage through a second voltage-dividing ratio;
wherein the second threshold voltage is timing threshold voltage, and the second peak value voltage is the peak value of the second capacitor voltage.

8. The flyback power converter according to claim 7, wherein the operation circuit further comprising:
a voltage trigger generating circuit, coupled to the sampling circuit, the first and the second charge-discharge circuits, the first and the second threshold voltage generating circuits, and the voltage-dividing circuit, wherein the voltage trigger generating circuit outputs a switch cut-off pulse signal, a first discharging pulse signal, and a second discharging pulse signal according to the first and the second logic signals received, the first and the second capacitor voltages, and the first and the second threshold voltages.

9. The flyback power converter according to claim 8, wherein the voltage trigger generating circuit comprising:
a third comparator, having a positive input end receiving the first threshold voltage, and a negative input end receiving the first capacitor voltage;
a first AND gate, coupled to an output terminal of the second logic signal and the third comparator, outputting the first discharging pulse signal;
a fourth comparator, having a positive input end receiving the second threshold voltage, and a negative input end receiving the second capacitor voltage;
a second AND gate, coupled to an output terminal of the first logic signal and the fourth comparator, outputting the second discharging pulse signal; and
an OR gate, coupled to an output terminal of the first and the second AND gates to receive the first and the second discharging pulse signals;
wherein when the first or the second discharging pulse signal is a high level voltage, the OR gate outputs the switch cut-off pulse signal at the time to cut off the synchronous rectification switch before the next switching period starts.

10. The flyback power converter according to claim 8, wherein when the first capacitor voltage is lower than the first threshold voltage, the voltage trigger generating circuit outputs the first discharging pulse signal to the first charge-discharge circuit to reduce the first capacitor voltage until being a zero voltage.

11. The flyback power converter according to claim 10, wherein when the voltage trigger generating circuit outputs the first or the second discharging pulse signal, the switch cut-off pulse signal is outputted in the meantime to cut the synchronous rectification switch off earlier before a next switching period.

12. The flyback power converter according to claim 8, wherein when the second capacitor voltage is lower than the second threshold voltage, the voltage trigger generating circuit outputs the second discharging pulse signal to the second charge-discharge circuit to reduce the second capacitor voltage until being a zero voltage.

13. The flyback power converter according to claim 12, wherein when the voltage trigger generating circuit outputs the first or the second discharging pulse signal, the switch cut-off pulse signal is outputted in the meantime to cut off the synchronous rectification switch earlier before a next switching period.

14. The flyback power converter according to claim 7, wherein the second charge-discharge circuit comprising:
   a fourth charging resistor, having a terminal coupled to the system voltage;
   a fifth charging resistor, having a terminal coupled to another terminal of the fourth charging resistor, and another terminal coupled to the second ground voltage;
   a sixth charging resistor, having a terminal coupled to the system voltage;
   a six transistor, having a base coupled to another terminal of the fourth charging resistor, and an emitter coupled to another terminal of the sixth charging resistor; and
   a second timing capacitor, having a terminal coupled to a collector of the sixth transistor, and another terminal coupled to the second ground voltage, wherein a second charging current source is consisted of the fourth charging resistor, the fifth charging resistor, the sixth charging resistor, and the sixth transistor.

15. The flyback power converter according to claim 14, wherein the second charge-discharge circuit further comprising:
   a seventh transistor, having a drain coupled to a terminal of the second timing capacitor, and a gate receiving a second discharging pulse signal, and a source coupled to the second ground voltage;
   an eighth transistor, having a collector coupled to a terminal of the second timing capacitor, and an emitter coupled to the second ground voltage;
   a ninth transistor, having a base coupled to the base of the eighth transistor, and an emitter coupled to the second ground voltage;
   a second discharging resistor, having a terminal coupled to the system voltage, and another terminal coupled to a collector and the base of the ninth transistor; and
   a tenth transistor, having a drain coupled to another terminal of the second discharging resistor, and a gate receiving the second logic signal, and a source coupled to the second ground voltage, wherein a second discharging current source is consisted of the eighth transistor, the ninth transistor, and the second discharging resistor.

16. The flyback power converter according to claim 15, wherein when the second logic signal is a high level voltage, the second timing capacitor is charged by the second charging current so as to generate the second capacitor voltage;
   when the second logic signal is a low level voltage, the second timing capacitor is discharged to the second discharging current source to release the second capacitor voltage,
      wherein when the second capacitor voltage is lower than the second threshold voltage, the seventh transistor is switched on according to the second discharging pulse signal so as to accelerate the discharging from the second timing capacitor, and to further reduce the second capacitor voltage until being a zero voltage.

17. The flyback power converter according to claim 7, wherein the second peak value detecting circuit comprising:
   a second diode, having an anode receiving the second capacitor voltage;
   a second storing capacitor, having a terminal o coupled to a cathode of the second diode, and another terminal coupled to the second ground voltage;
   a fourth discharging resistor, coupled to the second storing capacitor in parallel; and
   a third amplifier, having a positive input end coupled to another terminal of the second storing capacitor, and a negative input end coupled to an output terminal of the third amplifier, wherein the output terminal of the third amplifier outputs the second DC voltage, and the second DC voltage is equal to a peak value of a second capacitor voltage minus a forward voltage of the second diode.

18. The flyback power converter according to claim 17, wherein the second threshold voltage generating circuit comprising:
   a fifth adder resistor, having a terminal receiving a second DC voltage;
   a sixth adder resistor, having a terminal coupled to another terminal of the fifth adder resistor, and another terminal coupled to a second compensation voltage, wherein the second compensation voltage is a forward voltage of the second diode;
   a fourth amplifier, having a positive input end coupled to another terminal of the fifth adder resistor;
   a seventh adder resistor, having a terminal coupled to a negative input end of the fourth amplifier, and another terminal coupled to the second ground voltage;
   an eighth adder resistor, having a terminal coupled to a terminal of the seventh adder resistor, and another terminal coupled to an output terminal of the fourth amplifier, and outputting a second peak value voltage through the output terminal of the fourth amplifier, and the second peak value voltage is a peak value of the second capacitor voltage;
   a third voltage-dividing resistor, having a terminal receiving the second peak value voltage; and
   a fourth voltage-dividing resistor, having a terminal coupled to another terminal of the third voltage-dividing resistor and outputting a second threshold voltage, and another terminal coupled to the second ground voltage, wherein a second voltage-dividing ratio is a resistor value of the fourth voltage-dividing resistor divided by a sum of resistor values of the third and the fourth voltage-dividing resistors, and the second threshold voltage is the second voltage-dividing ratio multiplied by the second peak value voltage.

19. The flyback power converter according to claim 6, wherein the first charging-discharging converter comprising:
   a first charging resistor, having a terminal coupled to a system voltage;
   a second charging resistor, having a terminal coupled to another terminal of the first charging resistor, and another terminal coupled to the second ground voltage;
   a third charging resistor, having a terminal coupled to the system voltage;
   a first transistor, having a base coupled to another terminal of the first charging resistor, and an emitter coupled to another terminal of the third charging resistor; and
   a first timing capacitor, having a terminal coupled to the collector of the first transistor, and another terminal coupled to the second ground voltage, wherein a first charging current source is consisted of the first charging resistor, the second charging resistor, the third charging resistor, and the first transistor.

20. The flyback power converter according to claim 19, wherein the first charging-discharging converter further comprising:
- a second transistor, having a drain coupled to a terminal of the first timing capacitor, and a gate receiving a first discharging pulse signal, and a source coupled to the second ground voltage;
- a third transistor, having a collector coupled to a terminal of the first timing capacitor, and an emitter coupled to the second ground voltage;
- a fourth transistor, having a base coupled to a base of the third transistor, and an emitter coupled to the second ground voltage;
- a first discharging resistor, having a terminal coupled to the system voltage, and another terminal coupled to a collector and the base of the fourth transistor; and
- a fifth transistor, having a drain coupled to another terminal of the first discharging resistor, and a gate receiving the first logic signal, and a source coupled to the second ground voltage, wherein a first discharging current source is consisted of the third transistor, the fourth transistor, and the first discharging resistor.

21. The flyback power converter according to claim 20, wherein when the first logic signal is a high level voltage, the first timing capacitor is charged by the first charging current source so as to generate the first capacitor voltage; when the first logic signal is a low level voltage, the first timing capacitor discharges to the first discharging current source so as to release the first capacitor voltage,
wherein when the first capacitor voltage is lower than the first threshold voltage, the second transistor is switched on according to the first discharging pulse signal so as to accelerate the discharging from the first timing capacitor and further to reduce the first capacitor voltage until being a zero voltage.

22. The flyback power converter according to claim 6, wherein the first peak value detecting circuit comprising:
- a first diode, having an anode receiving the first capacitor voltage;
- a first storing capacitor, having a terminal coupled to a cathode of the first diode, and another terminal coupled to the second ground voltage;
- a third discharging resistor, coupled to the first storing capacitor in parallel; and
- a first amplifier, having a positive input end coupled to a terminal of the first storing capacitor, and a negative input end coupled to an output terminal of the first amplifier, wherein the output terminal of the first amplifier outputs a first DC voltage, and the first DC voltage is equal to a peak value of a first capacitor voltage minus a forward voltage of the first diode.

23. The flyback power converter according to claim 22, wherein the first threshold voltage generating circuit comprising:
- a first adder resistor, having a terminal receiving the first DC voltage;
- a second adder resistor, having a terminal coupled to another terminal of the first adder resistor, and another terminal coupled to the first compensation voltage, wherein the first compensation voltage is a forward voltage of the first diode;
- a second amplifier, having a positive input end coupled to another terminal of the first adder resistor;
- a third adder resistor, having a terminal coupled to a negative input end of the second amplifier, and another terminal coupled to the second ground voltage;
- a fourth adder resistor, having a terminal coupled to a terminal of the third adder resistor, and another terminal coupled to the output terminal of the second amplifier, and outputting a first peak value voltage through the output terminal of the second amplifier, and the first peak value voltage is the peak value of the first capacitor voltage;
- a first voltage-dividing resistor, having a terminal receiving the first peak value voltage; and
- a second voltage-dividing resistor, having a terminal coupled to another terminal of the first voltage-dividing resistor and outputting a first threshold voltage, and another terminal coupled to the second ground voltage, wherein a first voltage-dividing ratio is a resistor value of the second voltage-dividing resistor divided by a sum of the resistor values of the first and the second voltage-dividing resistors, and the first threshold voltage is the first voltage-dividing ratio multiplied by the first peak value voltage.

24. The flyback power converter according to claim 1, wherein the sampling circuit comprising:
- a first resistor, having a terminal coupled to a drain of a synchronous rectification switch;
- a second resistor, having a terminal coupled to another terminal of the first resistor, and another terminal coupled to a second ground voltage;
- a third resistor, having a terminal coupled to another terminal of the first resistor;
- a fourth resistor, having a terminal receiving a first voltage;
- a first comparator, having a negative input end coupled to another terminal of the third resistor, and a positive input end coupled to another terminal of the fourth resistor;
- a fifth resistor, having a terminal coupled to a positive input end of the first comparator, and another terminal coupled to an output terminal of the first comparator;
- a second comparator, having a negative input end coupled to the output terminal of the first comparator, and a positive input end receiving a second voltage; and
- a D-type flip-flop, having a data input end of the D-type flip-flop is coupled to a data anti-output end, and a data output end outputting a first logic signal, and the data anti-output end outputting a second logic signal, and a clock input end coupled to the output end of the second comparator and receiving a clock signal.

25. An electronic apparatus, comprising:
- a flyback power converter according to claim 1, suitable for a synchronous rectification under a continuous conduction mode, or a discontinuous conduction mode; and
- a load, coupled to the flyback power converter to receive an output voltage,
wherein when the first logic signal or the second logic signal is a low level voltage, the operation circuit executes timing for discharging; when the first logic signal or the second logic signal is a high level voltage, the operation circuit executes timing for charging, wherein the first logic signal and the second logic signal are complementary logically.

26. The electronic apparatus according to claim 25, wherein when the flyback power converter performs the synchronous rectification, the flyback power converter operates alone on the secondary side of the transformer, and during a switching period, when the main switch signal is transformed into a low level voltage, the control signal is transformed into a high level voltage, and when the voltage of the sensing signal is lower than the predetermined threshold voltage, the control signal is transformed into a low level voltage to cut the synchronous rectification switch off earlier.

\* \* \* \* \*